United States Patent
Chande et al.

(10) Patent No.: US 11,570,728 B2
(45) Date of Patent: Jan. 31, 2023

(54) POWER-ADJUSTED AND TRAFFIC DIRECTION-AWARE LISTEN-BEFORE-TALK (LBT) THRESHOLDS

(71) Applicant: QUALCOMM Incorporated, San Diego, CA (US)

(72) Inventors: Vinay Chande, San Diego, CA (US); Arumugam Chendamarai Kannan, San Diego, CA (US); Srinivas Yerramalli, Hyderabad (IN); Xiaoxia Zhang, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 9 days.

(21) Appl. No.: 17/248,231

(22) Filed: Jan. 14, 2021

(65) Prior Publication Data

US 2021/0227478 A1 Jul. 22, 2021

Related U.S. Application Data

(60) Provisional application No. 62/962,841, filed on Jan. 17, 2020.

(51) Int. Cl.
*H04W 52/38* (2009.01)
*H04W 52/24* (2009.01)

(52) U.S. Cl.
CPC ........... *H04W 52/38* (2013.01); *H04W 52/24* (2013.01)

(58) Field of Classification Search
CPC ... H04W 52/38; H04W 52/24; H04W 52/226; H04W 52/265; H04W 52/367; H04W 52/242
See application file for complete search history.

(56) References Cited

U.S. PATENT DOCUMENTS

2017/0230970 A1* 8/2017 Kim ..................... H04W 74/08
2018/0242364 A1* 8/2018 Park ..................... H04W 74/08

\* cited by examiner

*Primary Examiner* — Jamal Javaid
(74) *Attorney, Agent, or Firm* — Haynes and Boone, LLP

(57) ABSTRACT

Wireless communications systems and methods related to listen-before-talk (LBT) are provided. A first wireless communication device performs an LBT in a channel to contend for a first transmission opportunity (TXOP). The first wireless communication device receives, from a second wireless communication device, a first reservation signal reserving a second TXOP in the channel in response to the LBT, the second TXOP being different from the first TXOP. The first wireless communication device adjusts a signal detection threshold based on transmit power information associated with at least one of the first wireless communication device, the second wireless communication device, first data traffic to be communicated in the first TXOP, or second data traffic to be communicated in the second TXOP. The first wireless communication device determines whether to yield channel access during the second TXOP based on a signal measurement of the first reservation signal and the adjusted signal detection threshold.

24 Claims, 13 Drawing Sheets

POWER-ADJUSTED AND TRAFFIC DIRECTION-AWARE LISTEN-BEFORE-TALK (LBT) THRESHOLDS

CROSS REFERENCE TO RELATED APPLICATIONS

The present application claims priority to and the benefit of U.S. Provisional patent Application No. 62/962,841, filed Jan. 17, 2020, which is hereby incorporated by reference in its entirety as if fully set forth below and for all applicable purposes.

TECHNICAL FIELD

This application relates to wireless communication systems, and more particularly to performing listen-before-talk (LBT) with power-adjusted, traffic direction-aware reservation signal detection threshold.

Introduction

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. A transmitting node may listen to the channel to determine whether there are active transmissions in the channel. When the channel is idle, the transmitting node may transmit a reservation signal (e.g., a preamble) to reserve a transmission opportunity (TXOP) in the shared channel and may communicate with a receiving node during the TXOP.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes performing, by a first wireless communication device, a listen-before-talk (LBT) in a channel to contend for a first transmission opportunity (TXOP); receiving, by the first wireless communication device from a second wireless communication device, a first reservation signal reserving a second TXOP in the channel in response to the LBT, the second TXOP being different from the first TXOP; adjusting, by the first wireless communication device, a signal detection threshold based on transmit power information associated with at least one of the first wireless communication device, the second wireless communication device, first data traffic to be communicated in the first TXOP, or second data traffic to be communicated in the second TXOP; and determining, by the first wireless communication device, whether to yield channel access during the second TXOP based on a comparison of a signal measurement of the first reservation signal and the adjusted signal detection threshold.

In an additional aspect of the disclosure, a method of wireless communication includes performing, by a first wireless communication device, a listen-before-talk (LBT) in a channel to contend for a first transmission opportunity (TXOP); receiving, by the first wireless communication device from a second wireless communication device, a first reservation signal reserving a second TXOP in the channel in response to the LBT, the second TXOP different from the first TXOP; selecting, by the first wireless communication device, a signal detection threshold based on at least one of a communication role of the first wireless communication device in the first TXOP or a communication role of the second wireless communication device in the second TXOP; and determining, by the first wireless communication device, whether to yield channel access during the second TXOP based on a comparison of a signal measurement of the first reservation signal and the signal detection threshold.

In an additional aspect of the disclosure, an apparatus including a processor configured to perform a listen-before-talk (LBT) in a channel to contend for a first transmission opportunity (TXOP); and a transceiver configured to receive, from a second wireless communication device, a first reservation signal reserving a second TXOP in the channel in response to the LBT, the second TXOP being different from the first TXOP, where the processor is further configured to adjust a signal detection threshold based on transmit power information associated with at least one of the apparatus, the second wireless communication device, first data traffic to be communicated in the first TXOP, or second data traffic to be communicated in the second TXOP; and determine whether to yield channel access during the second TXOP based on a comparison of a signal measurement of the first reservation signal and the adjusted signal detection threshold.

In an additional aspect of the disclosure, an apparatus includes a processor configured to perform a listen-before-talk (LBT) in a channel to contend for a first transmission opportunity (TXOP); and a transceiver configured to receive, from a second wireless communication device, a first reservation signal reserving a second TXOP in the channel in response to the LBT, the second TXOP different from the first TXOP, where the processor is further configured to select a signal detection threshold based on at least one of a communication role of the apparatus in the first TXOP or a communication role of the second wireless communication device in the second TXOP; and determine whether to yield channel access during the second TXOP based on a comparison of a signal measurement of the first reservation signal and the signal detection threshold.

In an additional aspect of the disclosure, a non-transitory computer-readable medium having program code recorded thereon, the program code includes code for causing a first wireless communication device to perform a listen-before-talk (LBT) in a channel to contend for a first transmission opportunity (TXOP); code for causing the first wireless communication device to receive, from a second wireless communication device, a first reservation signal reserving a second TXOP in the channel in response to the LBT, the second TXOP being different from the first TXOP; code for causing the first wireless communication device to adjust a signal detection threshold based on transmit power information associated with at least one of the first wireless communication device, the second wireless communication device, first data traffic to be communicated in the first TXOP, or second data traffic to be communicated in the second TXOP; and code for causing the first wireless communication device to determine whether to yield channel access during the second TXOP based on a comparison of a signal measurement of the first reservation signal and the adjusted signal detection threshold.

In an additional aspect of the disclosure, a non-transitory computer-readable medium having program code recorded thereon, the program code includes code for causing a first wireless communication device to perform a listen-before-talk (LBT) in a channel to contend for a first transmission opportunity (TXOP); code for causing the first wireless communication device to receive, from a second wireless communication device, a first reservation signal reserving a second TXOP in the channel in response to the LBT, the second TXOP different from the first TXOP; code for causing the first wireless communication device to select a signal detection threshold based on at least one of a communication role of the first wireless communication device in the first TXOP or a communication role of the second wireless communication device in the second TXOP; and code for causing the first wireless communication device to determine whether to yield channel access during the second TXOP based on a comparison of a signal measurement of the first reservation signal and the signal detection threshold.

In an additional aspect of the disclosure, an apparatus includes means for performing a listen-before-talk (LBT) in a channel to contend for a first transmission opportunity (TXOP); means for receiving, from a second wireless communication device, a first reservation signal reserving a second TXOP in the channel in response to the LBT, the second TXOP being different from the first TXOP; means for adjusting a signal detection threshold based on transmit power information associated with at least one of the apparatus, the second wireless communication device, first data traffic to be communicated in the first TXOP, or second data traffic to be communicated in the second TXOP; and means for determining whether to yield channel access during the second TXOP based on a comparison of a signal measurement of the first reservation signal and the adjusted signal detection threshold.

In an additional aspect of the disclosure, an apparatus includes means for performing a listen-before-talk (LBT) in a channel to contend for a first transmission opportunity (TXOP); means for receiving, from a second wireless communication device, a first reservation signal reserving a second TXOP in the channel in response to the LBT, the second TXOP different from the first TXOP; means for selecting a signal detection threshold based on at least one of a communication role of the apparatus in the first TXOP or a communication role of the second wireless communication device in the second TXOP; and means for determining whether to yield channel access during the second TXOP based on a comparison of a signal measurement of the first reservation signal and the signal detection threshold.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
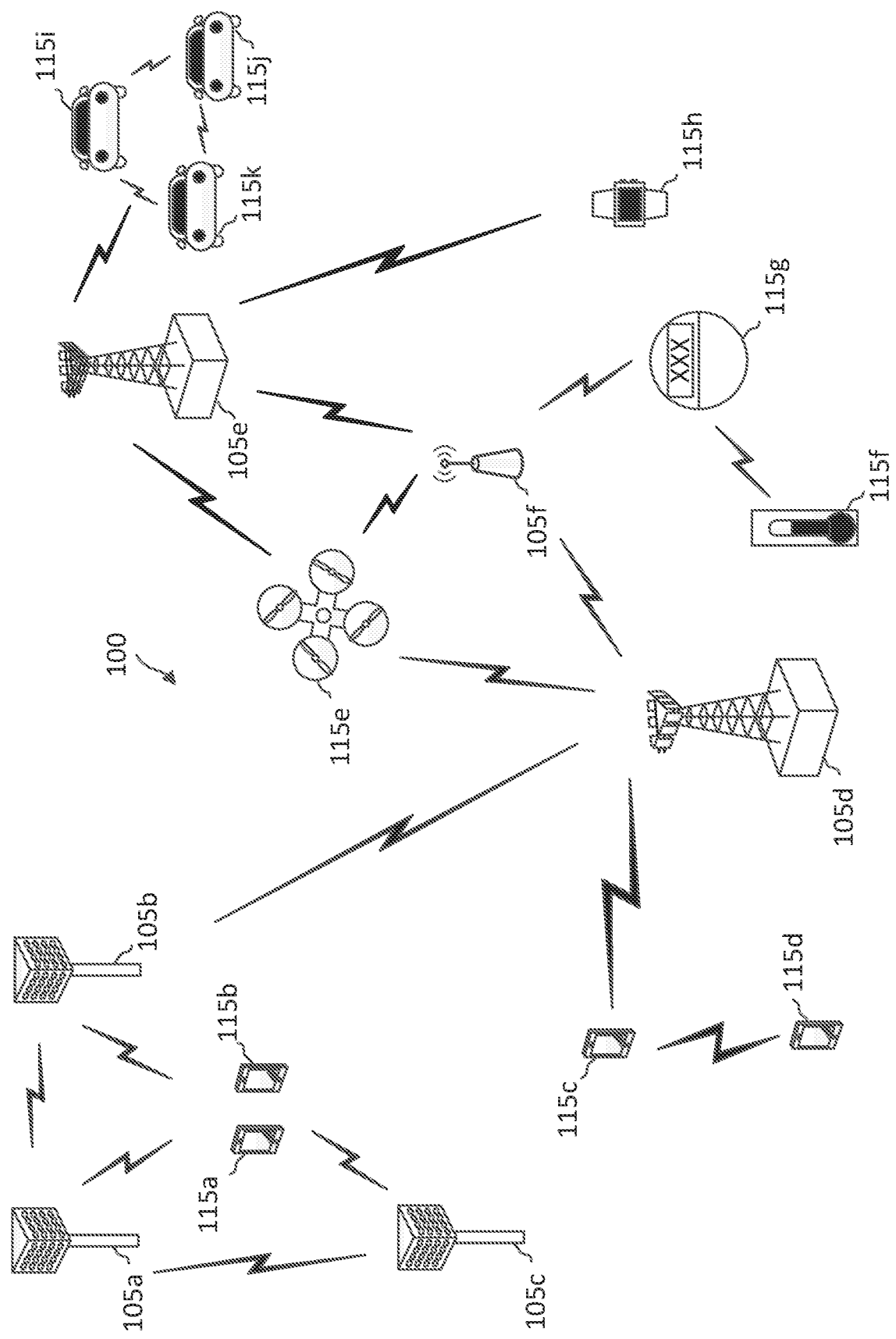
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A medium access protocol for medium access in an unlicensed band or a shared channel may utilize reservation signaling, such as request-to-send (RTS)/clear-to-send (CTS) mechanisms in IEEE 802.11, where an initiator node (e.g., a source node) and a responder node (e.g., a destination node) may send reservation signals. For instance, a reservations signal may include a preamble and reservation information. Other nodes may perform listening or sensing in the medium to contend for medium access. A contending node may attempt to decode a reservation signal in the channel. If the contending node can decode a reservation signal from the channel, the contending node may apply a preamble detection threshold to determine whether to respect the reservation signal and/or the reservation information (e.g., a reservation duration) indicated by the reservation signal. For instance, if the received signal power of the reservation signal measured at the contending node is greater than the preamble detection threshold, the contending node may yield channel access and refrain from transmitting in the channel during the reservation duration. If the received signal power of the reservation signal measured at the contending node is below the preamble detection threshold, the contending node may disregard the reservation signal and proceed to transmit in the channel. In some instances, a preamble detection threshold may also be referred to as a clear channel assessment (CCA) threshold, a listen-before-talk (LBT) threshold, or a signal detection threshold.

In a certain wireless communication network, such as an IEEE 802.11 network, a contending node may apply different preamble detection thresholds depending on whether the reservation is received from a node of the same operator as the contending node or received from a node of a different operator than the contending node. For instance, in IEEE 802.11, a reservation signal may include a basic service set (BSS) coloring indication, where nodes operated by the same operator may be assigned with the same BSS color. As such, a contending node may determine whether a detected reservation is from a node of the same operator by determining whether a BSS color indicated by the reservation matches the BSS color of the contending node. The use of BSS coloring for reservations can allow a network to have better control over intra-operator interference vs inter-operator interferences. However, nodes within the same operator may have different transmission characteristics, processing capabilities, and/or interference tolerances. Additionally, the silencing capability or protection capability for a receiver vs a transmitter may be different. Accordingly, it may be beneficial to have a finer control on LBT signal detection thresholds.

The present application describes mechanisms for performing LBTs with power-adjusted, traffic direction-aware signal detection thresholds. For example, a listening node may perform an LBT in a channel (e.g., a shared frequency band or an unlicensed band) to contend for a first transmission opportunity (TXOP). The listening node may receive, from another node, a reservation signal reserving a second TXOP in the channel in response to the LBT, where the second TXOP is different from the first TXOP. In some aspects, the listening node may determine a signal detection threshold based on transmit power information associated with at least one of the listening node, the reservation signal sending node, first data traffic to be communicated in the first TXOP, or second data traffic to be communicated in the second TXOP. In some aspects, the listening node may determine a signal detection threshold based on at least one of a communication role (e.g., as a transmitter or as a receiver or both) of the listening node in the first TXOP or a communication role of the reservation signal sending node in the second TXOP. The listening node may subsequently determine whether to yield channel access during the second TXOP based on a comparison of a signal measurement (e.g., a received signal quality metric) of the first reservation signal and the determined signal detection threshold. For instance, if the signal measurement is greater than the signal detection threshold, the listening node may respect the reservation signal by yielding channel access during the second TXOP. Conversely, if the signal measurement is below the signal detection threshold, the listening node may not respect the reservation signal and may proceed to communicate in the channel with another node during the first TXOP, which may be at least partially overlapping with the second TXOP reserved by the reservation signal sending node.

In some aspects, the listening node may determine the signal detection threshold by adjusting an LBT signal detection threshold based on a transmit power of the listening node and a transmit power of the reservation sending node. In some aspects, the listening node may determine the signal detection threshold by adjusting an LBT signal detection threshold based on a transmit power of the reservation sending node and a transmit power to be used for communicating the second data traffic in the second TXOP.

In some aspects, the listening node may determine the signal detection threshold by selecting a signal detection threshold based on whether the reservation signal sending node is a transmitter or a receiver during the second TXOP and/or whether reservation signal sending node is a base station (BS) or a user equipment (UE). In some aspects, the listening node may determine the signal detection threshold by selecting a signal detection threshold based on whether the listening node is a transmitter or a receiver during the first TXOP and/or whether listening node is a BS or a UE. In some aspects, the listening node may determine the signal detection threshold by selecting a signal detection threshold based on whether the reservation signal is an RRQ/RTS signal or an RRS/CTS signal. In general, the listening node may determine signal detection threshold based on any suitable combination of the attributes or factors (e.g., transmit powers, communication roles, node types, and/or reservation signal types) discussed above.

In some aspects, a reservation signal sending node may include various reservation information in a reservation signal (e.g., an RRQ/RTS signal or an RRS/CTS signal). Some examples of reservation information may include a duration of the reservation (e.g., the TXOP), a transmit power used for transmitting the reservation signal, a transmit power to be used for transmitting data traffic in an upcoming TXOP reserved by the reservation signal, a communication role (e.g., as a transmitter or a receiver) of the reservation sending node in the upcoming reserved TXOP, a node type (e.g., a BS or a UE) of the reservation sending node, and/or signal type (e.g., RRS/RTS or RRS/CTS) of the reservation signal to facilitate an LBT signal detection threshold determination at a listening node contending for access in the channel.

Aspects of the present disclosure can provide several benefits. For example, the adjustment or selection of an LBT signal detection threshold with considerations for transmit powers of the listening node, the reservation sending node, and/or the data traffic to be communicated in an upcoming TXOP, the communication role of the listening node for the contention, the communication role of the reservation sending node for the reservation, the node types of the listening node and/or the reservation sending node, and/or the signal types of the detected reservation signals can improve medium access performance, for example, avoiding over-silencing and/or under-silencing for certain nodes and/or certain types of communications. The disclosed aspects may be suitable for use in any types of wireless communication network and/or any types of medium access protocols (e.g., NR-unlicensed (NR-U) and/or IEEE 802.11).

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point (e.g., an IEEE 802.11 AP), and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, an IEEE 802.11 terminal station (STA), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

Figure 2:
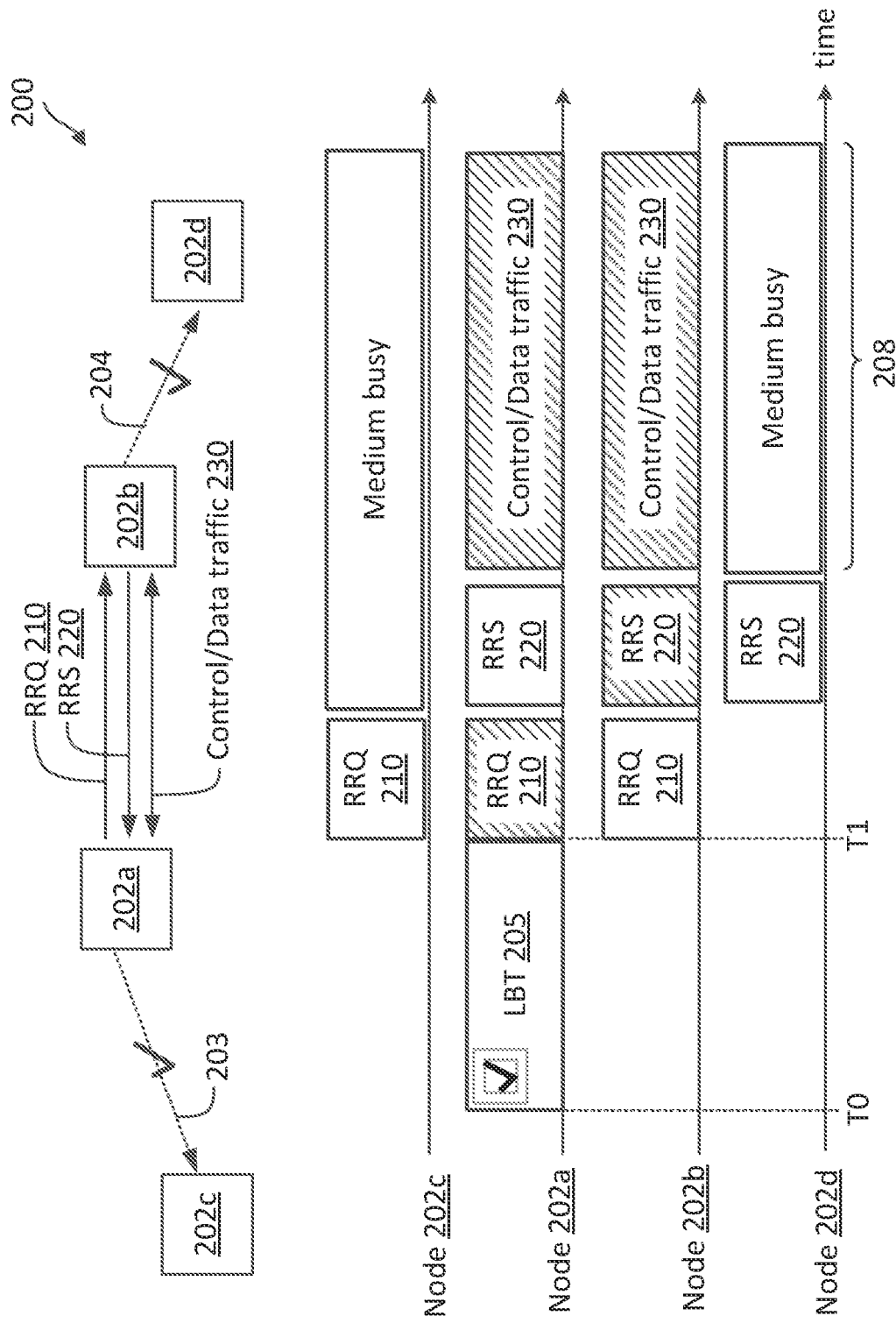
FIG. 2 illustrates a channel access scenario according to some aspects of the present disclosure.

FIG. 2 illustrates a channel access scenario 200 with two-way reservation according to some aspects of the present disclosure. The scenario 200 may correspond to a channel access scenario in a network such as the network 100 operating over a shared channel (e.g., a shared frequency band or an unlicensed frequency band). Channel access in the scenario 200 is based on a two-way reservation protocol, where an initiating node may transmit a reservation request (RRQ) signal to initiate a reservation in the channel and a responding node may transmit a reservation response (RRS) signal in response to the RRQ signal. Other nodes contending for channel access may perform an LBT by monitoring the channel for a reservation signal (e.g., an RRQ signal and/or an RRS signal). A contending node may attempt to decode an RRQ signal or an RRS signal from a received signal. If the contending node can decode an RRQ signal or an RRS signal from the received signal, the contending node may measure a received signal quality or received signal power of the RRQ signal or the RRS signal. The contending node determine may whether to respect the reservation signal and/or the reservation information (e.g., a reservation duration) indicated by the reservation signal based on a comparison between the received signal power of the incoming or detected reservation signal and a signal detection threshold (e.g., a preamble detection threshold). For example, if the received signal power of the detected reservation signal is greater than the signal detection threshold, the contending node may respect the reservation signal. In other words, the contending node may determine that the channel is busy and may yield channel access to the reserving node. If the received signal power of the detected reservation signal is less than the signal detection threshold, the contending node may disregard the detected reservation signal. In other words, the contending node may determine not to yield channel access to the reserving node and proceed to transmit in the channel.

For simplicity of discussion and illustration, FIG. 2 illustrates four nodes 202a, 202b, 202c, and 202d. However, the two-way reservation protocol can be implemented among any suitable number of nodes (e.g., about 5, 6, 7, 8 or more) for channel contentions and access. Each node 202 may correspond to a BS (e.g., a BS 105 or a IEEE 802.11 access point) or a UE (e.g., a UE 115 or an IEEE 802.11 terminal station). In FIG. 2, the x-axis represents time in some arbitrary units. The pattern-filled boxes represent transmissions and the empty-filled boxes represent receptions.

At time T0, the node 202a performs an LBT 205 in the channel. The LBT 205 may include monitoring the channel for a reservation signal (e.g., an RRQ signal or an RRS signal) and determining whether the channel is busy or occupied based on the monitoring, RRQ and/or RRS signal detection and decoding, and signal threshold comparison as discussed above. In some instances, the LBT 205 may be similar to a CAT4 LBT including a random backoff as discussed in FIG. 1. As an example, the LBT 205 is a pass (shown by the checkmark) indicating that the node 202a won the contention in the channel.

At time T1, upon passing the LBT 205, the node 202a transmits an RRQ signal 210 to reserve a TXOP 208 for communication with the node 202b. The RRQ signal 210 can include a predetermined preamble, a predetermined signal sequence, or a request-to-send (RTS) signal. In some instances, the RRQ signal 210 can include reservation information such as a duration of the TXOP 208 and a destination identifier (ID) identifying the node 202b for communication in the upcoming TXOP 208. The RRQ signal 210 may additionally include a schedule for communicating with the node 202b in the TXOP 208.

At time T2, in response to the RRQ signal 210, the node 202b transmits an RRS signal 220. The RRS signal 220 can be a predetermined preamble, a predetermined signal sequence, or a clear-to-send (CTS) signal. In some instances, the node 202a initiating the channel reservation or transmitting the RRQ signal 210 may be referred to as initiating node or a reserving source node. The node 202b responding to the RRQ signal 210 may be referred to as a responding node or a reserving destination node.

At time T3, upon receiving the RRS signal 220, the TXOP 208 is established and the node 202a may exchange control/data traffic 230 with the node 202b during the TXOP 208.

In some aspects, the reserving source node 202a may correspond to a BS 105 and the reserving destination node 202b may correspond to a UE 115. The RRQ signal 210 may include a trigger (e.g., a transmission schedule or a reception schedule) for communicating with the node 202b during the TXOP 208. In some instances, the TXOP 208 may be used for DL-centric communication. Thus, the trigger may be a DL transmission trigger and the control/data traffic 230 may include DL data traffic (e.g., PDSCH data) transmitted by the node 202a. The DL data traffic may be referred to as the primary data traffic in the TXOP 208. The control/data traffic 230 may also include DL control information (e.g., PDCCH) transmitted by the node 202a and/or UL control information (e.g., PUCCH such as HARQ ACK/NACK feedback and/or scheduling request) transmitted by the node 202b. In some other instances, the TXOP 208 may be used for UL-centric communication. Thus, the trigger may be a UL transmission trigger and the control/data traffic 230 may include UL data traffic (e.g., PUSCH data) transmitted by the node 202b. The UL data traffic may be referred to as the primary data traffic in the TXOP 208. The control/data traffic 230 may also include DL control information (e.g., PDCCH) transmitted by the node 202a and/or UL control information (e.g., PUCCH) transmitted by the node 202b.

The nodes 202c and 202d may be listening nodes, for example, each performing an LBT similar to the LBT 205 to contend for access to the channel. Each of the nodes 202c or 202d may be an initiating node or a responding node. In the illustrated example of FIG. 2, the node 202c may be located at a location close to the node 202a, and thus may detect the RRQ signal 210 transmitted by the node 202a (shown by the dotted arrow 203 with the checkmark). The node 202c may determine that the channel is busy based on a received signal power of the RRQ signal 210 measured at the node 202c being greater than a signal detection threshold. Thus, the node 202c may refrain from transmitting in the channel during the TXOP 208. As such, the RRQ signal 210 may silence nodes surrounding the node 202a and protect data transmission or data reception at the node 202a during the TXOP 208.

The node 202d may be located at a location close to the node 202b, and thus may detect the RRS signal 220 transmitted by the node 202b (shown by the dotted arrow 204 with the checkmark). The node 202d may determine that the medium is busy based on a received signal power of the RRS signal 220 measured at the node 202c being greater than a signal detection threshold. Thus, the node 202d may refrain from transmitting in the channel during the TXOP 208. As such, the RRS signal 220 may silence nodes surrounding the node 202b and protect data transmission or data reception at the node 202b during the TXOP 208.

In some aspects, different nodes may transmit at different transmit powers, for example, depending on the capability of the nodes. For instance, a low-power node may be power-limited, and thus may transmit at a lower power than a high-power node. Similarly, a UE may transmit at a lower power than a BS. Additionally, a small-cell BS may transmit at a lower power than a macro BS. The power heterogeneity can create asymmetric silencing when a node applies the same signal detection threshold for all reservation signals as shown in FIG. 3 below.

Figure 3:
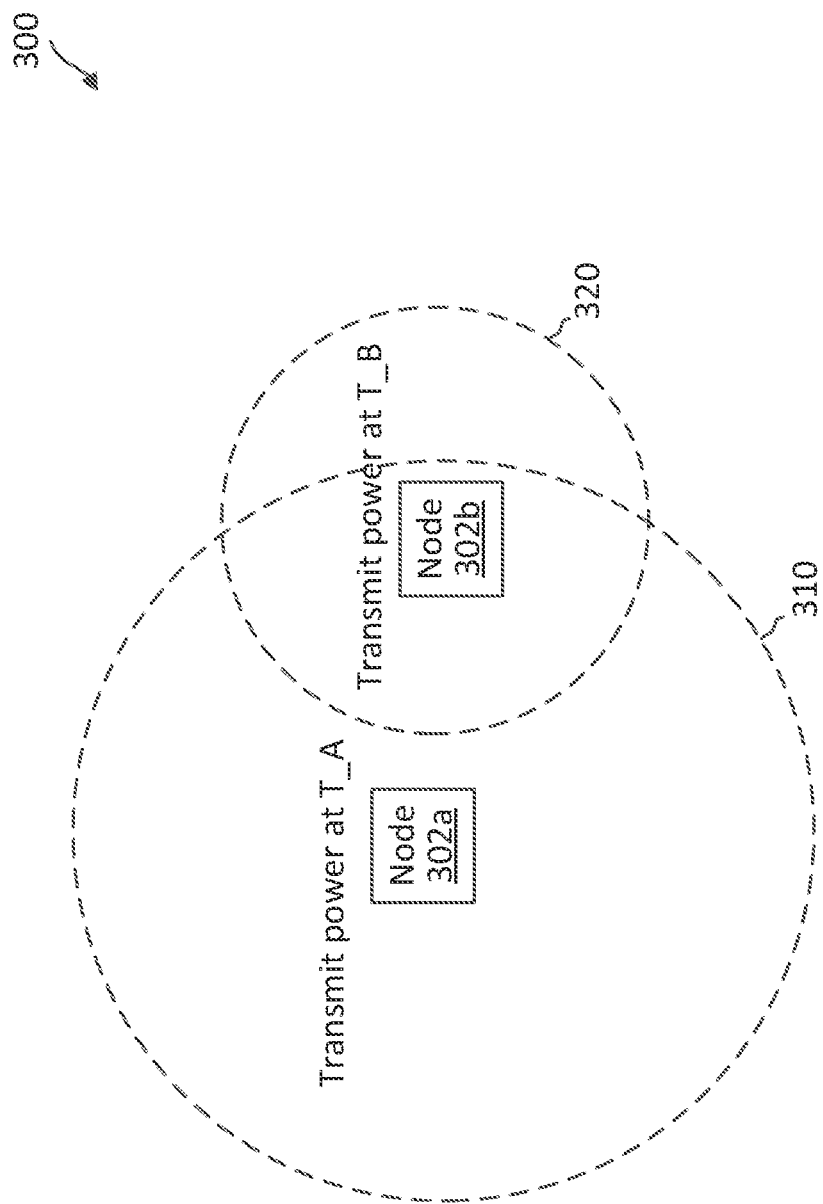
FIG. 3 illustrates a channel access scenario according to some aspects of the present disclosure.

FIG. 3 illustrates a channel access scenario 300 according to some aspects of the present disclosure. The scenario 300 may correspond to a channel access scenario in a network such as the network 100 operating over a shared channel (e.g., a shared frequency band or an unlicensed frequency band). The scenario 300 illustrates asymmetric silencing between a node 302a and a node 302b. The nodes 302a and 302b may be similar to the nodes 202, the BSs 105, and/or the UEs 115. In the scenario 300, the node 302a and the node 302b may utilize the same signal detection threshold for determining whether a channel is busy, but may use different transmit powers. For instance, the node 302a may transmit reservation signals (e.g., an RRQ signal 210 and/or an RRS signal 220) at a transmit power, denoted as T_A, and the node 302b may transmit signals at a transmit power, denoted as T_B, where T_A may be greater than T_B. A reservation signal of the node 302a may be detected by the node 302b as shown by a received power contour 310, and thus may silence the node 302b. However, a reservation signal of the node 302b may not be detected by the node 302a as shown by a received power contour 320, and thus may not silence the node 302a.

The asymmetric silencing between the node 302a and the node 302b can impact access or contentions in the channel. For instance, the node 302a may continuously gain access to the channel while the node 302b may not be able to gain access to the channel. As such, applying the same signal detection threshold at each node in a network can over silence certain nodes when the nodes have different transmit powers. Additionally, a node transmitting a reservation signal (e.g., the RRQ signal 210 and/or the RRS signal 220) may be a transmitter or a receiver of a primary data traffic in an upcoming TXOP (e.g., the TXOP 208), and thus may have different interference impacts and/or different interference tolerances to surrounding nodes.

Accordingly, the present disclosure provides techniques for a listening node or contending node to consider power heterogeneity among reserving nodes and the contending node, a traffic direction associated with a reserving node's reservation, and/or and a traffic direction associated with a contention of the contending node. For instance, the listening node or contending node may adjust and/or select an LBT signal detection threshold based on a transmit power of the listening node itself, a transmit power of an incoming or detected reservation signal, a transmit power to be used for communicating data traffic associated with the reservation signal, a transmit power to be used for communicating data traffic associated with the listening node's contention, a communication role (e.g., a transmitter or a receiver) of the reservation signal sending node in the reserved TXOP, a communication role of the listening node in the TXOP contending by the listening node, a node type (e.g., a BS 105 or a UE 115) of the listening node, a node type of the reservation signal sending node, and/or a signal type (e.g., an RRQ signal 210 or an RRS signal 220) of the incoming or detected reservation signal as described in greater detail herein.

Figure 4:
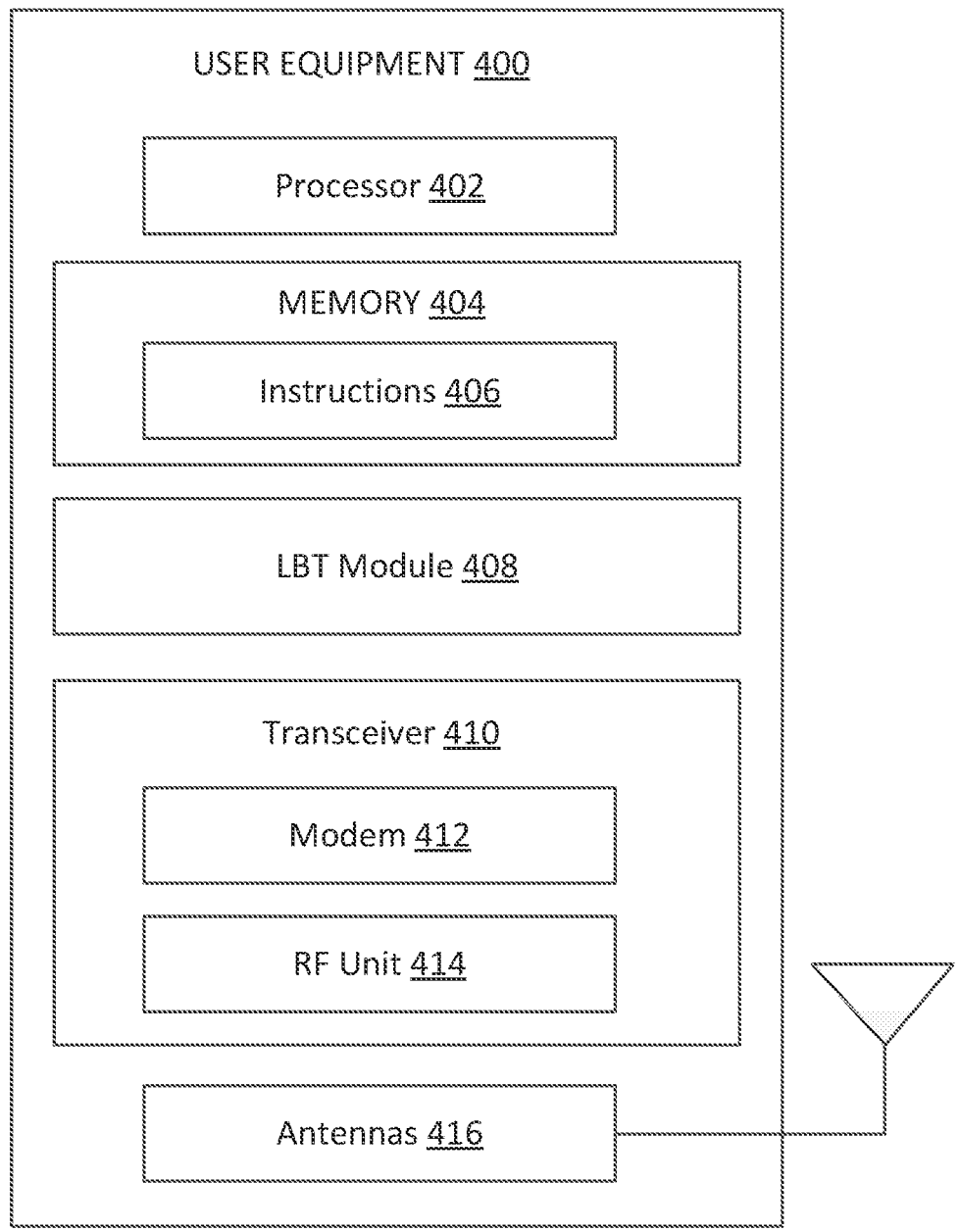
FIG. 4 is a block diagram of a user equipment (UE) according to some aspects of the present disclosure.

FIG. 4 is a block diagram of an exemplary UE 400 according to some aspects of the present disclosure. The UE 400 may be a UE 115 discussed above in FIG. 1, a node 202 discussed above in FIG. 2, or a node 302 discussed above in FIG. 3. As shown, the UE 400 may include a processor 402, a memory 404, an LBT module 408, a transceiver 410 including a modem subsystem 412 and a radio frequency (RF) unit 414, and one or more antennas 416. These elements may be coupled with one another. The term "coupled" may refer to directly or indirectly coupled or connected to one or more intervening elements. For instance, these elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 1-3 and 6-15. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The LBT module 408 may be implemented via hardware, software, or combinations thereof. For example, the LBT module 408 may be implemented as a processor, circuit, and/or instructions 406 stored in the memory 404 and executed by the processor 402. In some instances, the LBT module 408 can be integrated within the modem subsystem 412. For example, the LBT module 408 can be implemented by a combination of software components (e.g., executed by a DSP or a general processor) and hardware components (e.g., logic gates and circuitry) within the modem subsystem 412.

The LBT module 408 may be used for various aspects of the present disclosure, for example, aspects of FIGS. 1-3 and 6-15. For instance, the LBT module 408 is configured to perform an LBT in a channel (e.g., a shared frequency band or an unlicensed band) to contend for a first TXOP, receive, from another node (e.g., the BSs 105, the UEs 115, and/or the nodes 202 or 302), a reservation signal reserving a second TXOP in the channel in response to the LBT, where the second TXOP is different from the first TXOP. In some aspects, the LBT module 408 is further configured to determine a signal detection threshold based on transmit power information associated with at least one of the UE 400, the reservation sending node, first data traffic to be communicated in the first TXOP, or second data traffic to be communicated in the second TXOP. In some aspects, the LBT module 408 is further configured to determine a signal detection threshold based on at least one of a communication role of the UE 400 in the first TXOP or a communication role of the reservation signal sending node in the second TXOP. The LBT module 408 is further configured to determine whether to yield channel access during the second TXOP based on a comparison of a signal measurement (e.g., a received signal quality metric) of the first reservation signal and the determined signal detection threshold, yield channel access during the second TXOP if the signal measurement is greater than the signal detection threshold, and/or proceed to communicate during the first TXOP (e.g., at least partially overlapping with the second TXOP) if the signal measurement is below the signal detection threshold.

In some aspects, the LBT module 408 is further configured to determine the signal detection threshold by adjusting an LBT signal detection threshold based on a transmit power of the listening node and a transmit power of the reservation sending node. In some aspects, the LBT module 408 is further configured to determine the signal detection threshold by adjusting an LBT signal detection threshold based on a transmit power of the reservation sending node and a transmit power to be used for communicating the second data traffic in the second TXOP.

In some aspects, the LBT module 408 is further configured to determine the signal detection threshold by selecting a signal detection threshold based on whether the reservation signal sending node is a transmitter or a receiver during the second TXOP and/or whether reservation signal sending node is a BS or a UE. In some aspects, the LBT module 408 is further configured to determine the signal detection threshold by selecting a signal detection threshold based on whether the UE 400 is a transmitter or a receiver during the first TXOP and/or based on UE 400 being a UE. In some aspects, the LBT module 408 is further configured to determine the signal detection threshold by selecting a signal detection threshold based on whether the reservation signal is an RRQ/RTS signal or an RRS/CTS signal.

In some aspects, the LBT module 408 is further configured to transmit a reservation signal to reserve a TXOP in the channel. The reservation signal may include various reservation information, such as a duration of the reservation (e.g., the TXOP), a transmit power used for transmitting the reservation signal, a transmit power to be used for transmitting data traffic in an upcoming TXOP reserved by the reservation signal, a communication role (e.g., as a transmitter or a receiver) of the reservation sending node in the upcoming reserved TXOP, a node type (e.g., a BS or a UE) of the reservation sending node, and/or signal type (e.g., RRS/RTS or RRS/CTS) of the reservation signal to facilitate an LBT signal detection threshold determination at a listening node contending for access in the channel. In general, the LBT module 408 can be configured to determine signal detection threshold based on any suitable combination of the attributes or factors (e.g., transmit powers, communication roles, node types, and/or reservation signal types) discussed above. Mechanisms for performing channel access and determining LBT signal detection thresholds are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the LBT module 408 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 414 may be configured to process (e.g., perform analog to digital conversion or digital to analog conversion, etc.) modulated/encoded data (e.g., RRQ signal, RRS signal, RTS, CTS, reservation information, UL traffic) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., RRQ signal, RRS signal, RTS, CTS, reservation information, DL traffic) to the LBT module 408 for processing. The antennas 416 may include multiple antennas of similar or different designs in order to sustain multiple transmission links. The RF unit 414 may configure the antennas 416.

In some aspects, the processor 402 is configured to perform an LBT in a channel to contend for a first TXOP. The transceiver is coupled to the processor 402 and configured to receive, from a second wireless communication device, a first reservation signal reserving a second TXOP in the channel in response to the LBT. The second TXOP is different from the first TXOP. The processor 402 is further configured to adjust a signal detection threshold based on transmit power information associated with at least one of the UE 400, the second wireless communication device, first data traffic to be communicated in the first TXOP, or second data traffic to be communicated in the second TXOP. The processor 402 is further configured to determine whether to yield channel access during the second TXOP based on a comparison of a signal measurement of the first reservation signal and the adjusted signal detection threshold, for example, by coordinating with the LBT module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
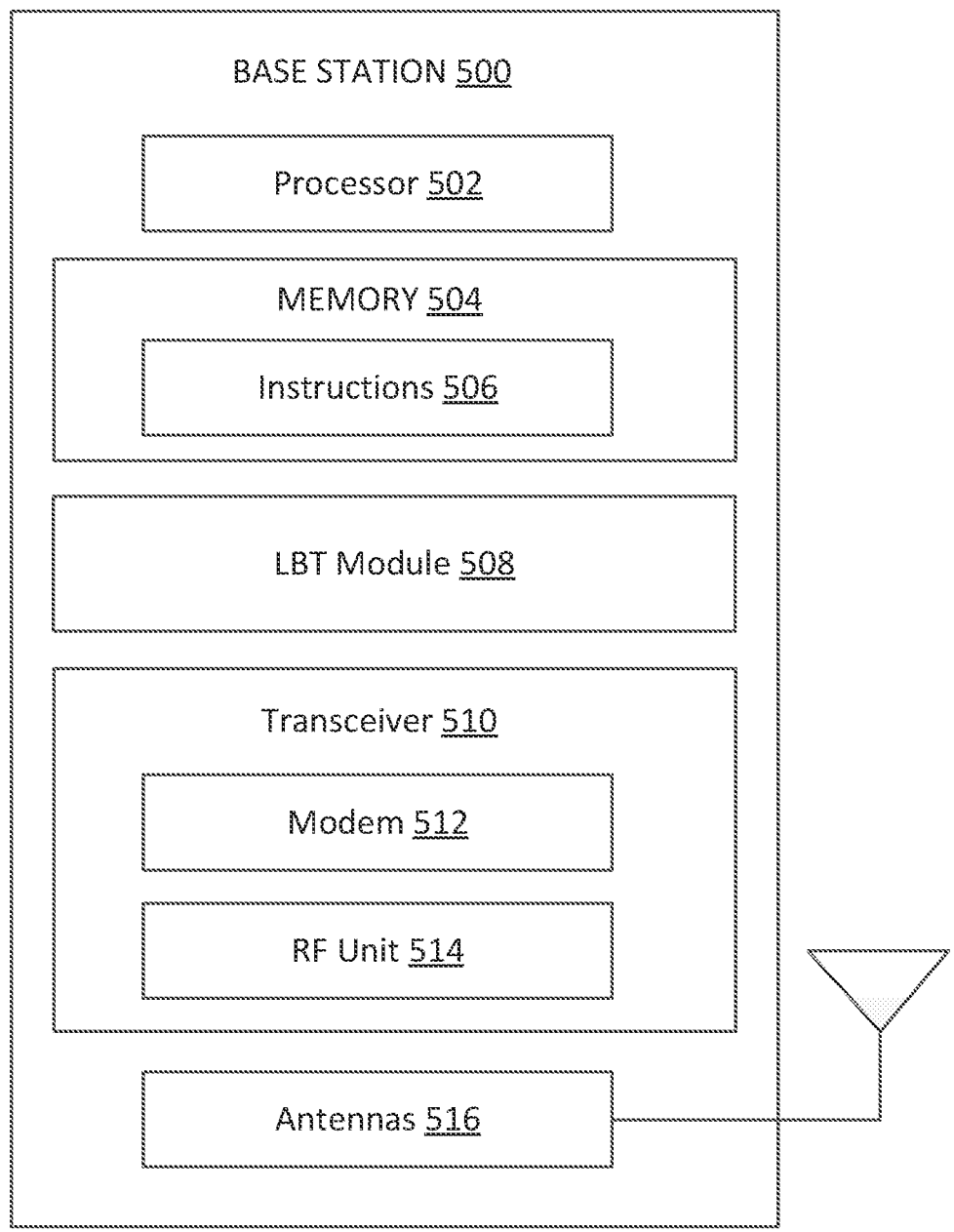
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1, a node 202 discussed above in FIG. 2, or a node 302 discussed above in FIG. 3. As shown, the BS 500 may include a processor 502, a memory 504, an LBT module 508, a transceiver 510 including a modem subsystem 512 and a RF unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 1-3 and 6-15. Instructions 506 may also be referred to as code, which may be interpreted broadly to include any type of computer-readable statement(s) as discussed above with respect to FIG. 4.

The LBT module 508 may be implemented via hardware, software, or combinations thereof. For example, the LBT module 508 may be implemented as a processor, circuit, and/or instructions 506 stored in the memory 504 and executed by the processor 502. In some instances, the LBT module 508 can be integrated within the modem subsystem 512. For example, the LBT module 508 can be implemented by a combination of software components (e.g., executed by a DSP or a general processor) and hardware components (e.g., logic gates and circuitry) within the modem subsystem 512.

The LBT module 508 may be used for various aspects of the present disclosure, for example, aspects of FIGS. 1-3 and 6-15. For instance, the LBT module 508 is configured to perform an LBT in a channel (e.g., a shared frequency band or an unlicensed band) to contend for a first TXOP, receive, from another node (e.g., the BSs 105, the UEs 115, and/or the nodes 202 or 302), a reservation signal reserving a second TXOP in the channel in response to the LBT, where the second TXOP is different from the first TXOP. In some aspects, the LBT module 508 is further configured to determine a signal detection threshold based on transmit power information associated with at least one of the BS 500, the reservation sending node, first data traffic to be communicated in the first TXOP, or second data traffic to be communicated in the second TXOP. In some aspects, the LBT module 508 is further configured to determine a signal detection threshold based on at least one of a communication role of the BS 500 in the first TXOP or a communication role of the reservation signal sending node in the second TXOP. The LBT module 508 is further configured to determine whether to yield channel access during the second TXOP based on a comparison of a signal measurement (e.g., a received signal quality metric) of the first reservation signal and the determined signal detection threshold, yield channel access during the second TXOP if the signal measurement is greater than the signal detection threshold, and/or proceed to communicate during the first TXOP (e.g., at least partially overlapping with the second TXOP) if the signal measurement is below the signal detection threshold.

In some aspects, the LBT module 508 is further configured to determine the signal detection threshold by adjusting an LBT signal detection threshold based on a transmit power of the listening node and a transmit power of the reservation sending node. In some aspects, the LBT module 508 is further configured to determine the signal detection threshold by adjusting an LBT signal detection threshold based on a transmit power of the reservation sending node and a transmit power to be used for communicating the second data traffic in the second TXOP.

In some aspects, the LBT module 508 is further configured to determine the signal detection threshold by selecting a signal detection threshold based on whether the reservation signal sending node is a transmitter or a receiver during the second TXOP and/or whether reservation signal sending node is a BS or a UE. In some aspects, the LBT module 508 is further configured to determine the signal detection threshold by selecting a signal detection threshold based on whether the UE 400 is a transmitter or a receiver during the first TXOP and/or based on BS 500 being a BS. In some aspects, the LBT module 508 is further configured to determine the signal detection threshold by selecting a signal detection threshold based on whether the reservation signal is an RRQ/RTS signal or an RRS/CTS signal.

In some aspects, the LBT module 508 is further configured to transmit a reservation signal to reserve a TXOP in the channel. The reservation signal may include various reservation information, such as a duration of the reservation (e.g., the TXOP), a transmit power used for transmitting the reservation signal, a transmit power to be used for transmitting data traffic in an upcoming TXOP reserved by the reservation signal, a communication role (e.g., as a transmitter or a receiver) of the reservation sending node in the upcoming reserved TXOP, a node type (e.g., a BS or a UE) of the reservation sending node, and/or signal type (e.g., RRS/RTS or RRS/CTS) of the reservation signal to facilitate an LBT signal detection threshold determination at a listening node contending for access in the channel. In general, the LBT module 508 can be configured to determine signal detection threshold based on any suitable combination of the attributes or factors (e.g., transmit powers, communication roles, node types, and/or reservation signal types) discussed above. Mechanisms for performing channel access and determining LBT signal detection thresholds are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., RRQ signal, RRS signal, RTS, CTS, reservation information, DL traffic) from the modem subsystem 512 (on outbound transmissions) or of transmissions originating from another source such as a UE 115 and/or UE 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices and provide the received data messages for processing and/or demodulation at the transceiver 510. The transceiver 510 may provide the demodulated and decoded data (e.g., RRQ signal, RRS signal, RTS, CTS, reservation information, UL traffic) to the LBT module 508 for processing. The antennas 516 may include multiple antennas of similar or different designs in order to sustain multiple transmission links.

In some aspects, the transceiver 510 is configured to perform an LBT in a channel to contend for a first TXOP, receive, from a second wireless communication device, a first reservation signal reserving a second TXOP in the channel in response to the LBT, the second TXOP being different from the first TXOP, adjust a signal detection threshold based on transmit power information associated with at least one of the first wireless communication device, the second wireless communication device, first data traffic to be communicated in the first TXOP, or second data traffic to be communicated in the second TXOP, and whether to yield channel access during the second TXOP based on a comparison of a signal measurement of the first reservation signal and the adjusted signal detection threshold, for example, by coordinating with the LBT module 508.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
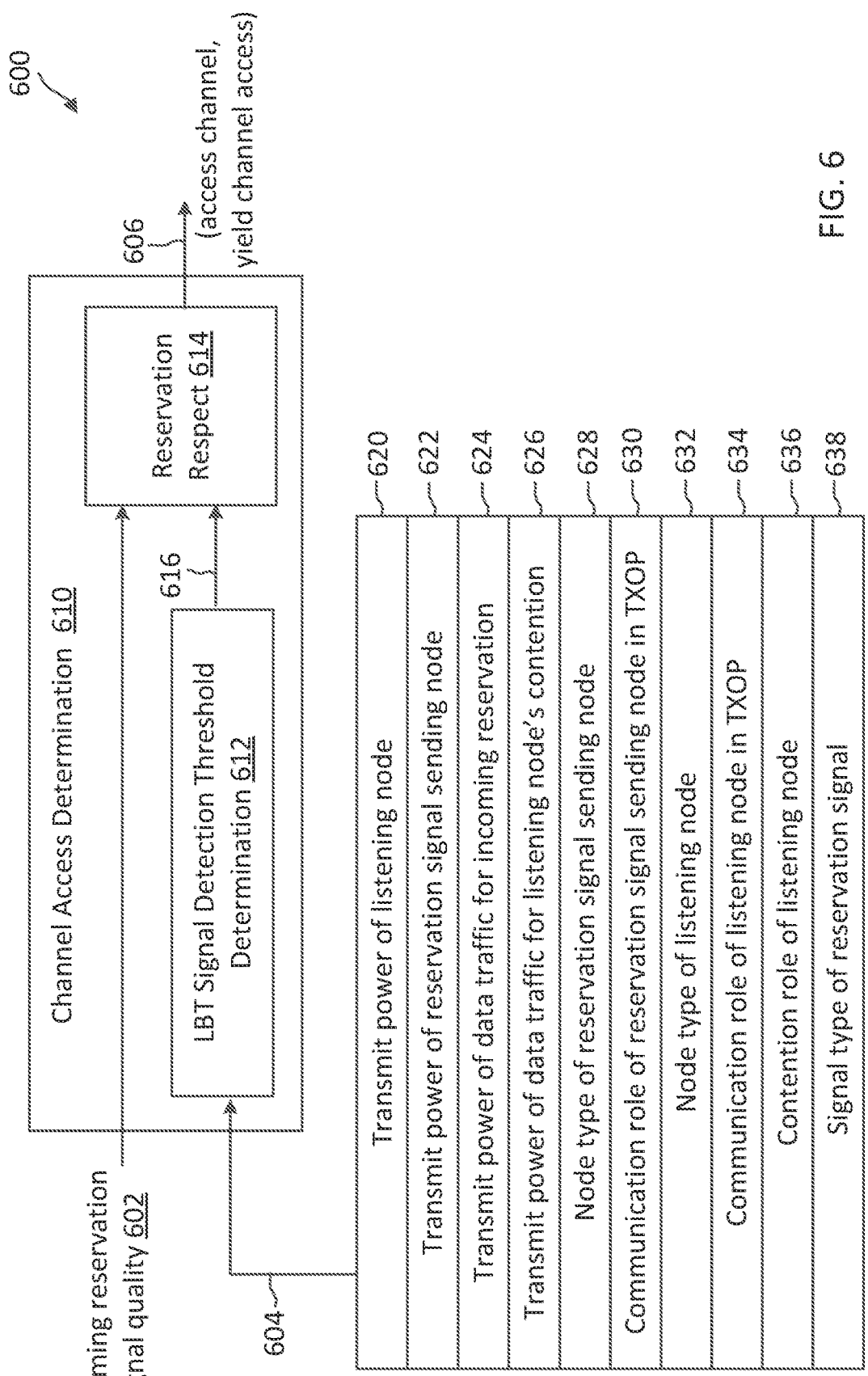
FIG. 6 illustrates a listen-before-talk (LBT) scheme power-adjusted, traffic direction-aware LBT signal detection thresholds according to some aspects of the present disclosure.

FIG. 6 illustrates an LBT scheme 600 with power-adjusted, traffic direction-aware LBT signal detection thresholds according to some aspects of the present disclosure. The scheme 600 may be employed by BSs such as the BSs 105 and 500, UEs such as the UEs 115 and 400, and nodes such as the nodes 202 and 302 in a network such as the network 100. In particular, a node contending for a TXOP in a shared channel (e.g., a shared frequency band or an unlicensed frequency band) may perform LBT and determine whether to respect a detected reservation signal as shown in the scheme 600. In the scheme 600, a listening node may determine an LBT signal detection threshold for respecting a detected reservation signal based on various attributes associated with the reservation signal, a sending node of reservation signal, a TXOP reserved by the reservation signal, the listening node itself, and/or a TXOP contended by the listening node.

In the scheme 600, a listening node (e.g., a BS 105 or 500, a UE 115 or 400, a node 202, or a node 302) may contend for a TXOP (e.g., the TXOP 208) in a medium (e.g., a shared frequency band or an unlicensed band). The listening node may monitor the channel for a reservation signal (e.g., the RRQ signal 210 and/or the RRS signal 220). In some instances, the listening node may utilize one or more components, such as the processor 402, the LBT module 408, the transceiver 410, the modem 412, and the one or more antennas 416, to receive a signal from the channel, perform RRQ and/or RRS decoding on the received signal to determine whether the received signal is a reservation signal or not. The decoding may include a preamble decoding to search for a predetermined RRQ preamble or a predetermined RRS preamble and/or recover any other reservation information indicated by the reservation signal. If the decoding is successful, the listening node had successfully received an incoming reservation signal. The listening node may measure a received signal quality metric 602 of the incoming reservation signal. In some instances, the received signal quality metric 602 can be a receive signal strength indicator (RSSI) or a received signal power. In some instances, the received signal quality metric 602a may be a signal-to-noise ratio (SNR) or a signal-to-interference-plus-noise-ratio (SINR) measured from the preamble in the reservation signal.

The listening node may include a channel access determination component 610. The channel access determination component 610 may be implemented by hardware and/or software components. In some instances, if the listening node is a BS, the channel access determination component 610 may be implemented by an LBT module similar to the LBT module 508. Alternatively, if the listening node is a UE, the channel access determination component 610 may be implemented by an LBT module similar to the LBT module 408. The channel access determination component 610 includes an LBT signal detection threshold determination component 612 and a reservation respect component 614.

The channel access determination component 610 is configured to receive the incoming reservation signal received signal quality metric 602 and apply an attribute configuration 604 to determine a decision 606 for accessing the channel. In this regard, the LBT signal detection threshold determination component 612 is configured to determine an LBT signal detection threshold 616 based on the attribute configuration 604. The reservation respect component 614 is configured to compare the incoming reservation signal quality metric 602 to the LBT signal detection threshold 616. If the incoming reservation signal quality metric 602 is greater than or equal to the LBT signal detection threshold 616, the reservation respect component 614 outputs a decision 606 not to access the channel. In other words, when the incoming reservation signal quality metric 602 is greater than the LBT signal detection threshold 616, the listening node may respect the incoming reservation signal and yield channel access during a TXOP reserved by the reservation signal. If the incoming reservation signal quality metric 602 is below the LBT signal detection threshold 616, the reservation respect component 614 outputs a decision 606 to access the channel. In other words, when the incoming reservation signal quality metric 602 is below the LBT signal detection threshold 616, the listening node may disregard the incoming reservation signal and access the channel in a TXOP contending by the listening node. The listening node's TXOP can be at least partially overlapping with the reserving node's TXOP.

The attribute configuration 604 may include various attributes associated with the reservation signal, a sending node (e.g., a BS 105 or 500, a UE 115 or 400, a node 202, or a node 302) of the incoming reservation signal, a TXOP (e.g., the TXOP 208) reserved by the reservation signal, the listening node itself, and/or a TXOP contended by the listening node. In some aspects, the attribute configuration 604 may include an attribute 620 associated with a transmit power of the listening node, an attribute 622 associated with a transmit power of the reservation signal sending node, an attribute 624 associated with a transmit power of the data traffic to be communicated in a TXOP reserved by the incoming reservation signal, an attribute 626 associated with a transmit power of the data traffic to be communicated in a TXOP contended by the listening node, an attribute 628 associated with a node type (e.g., a BS/AP or a UE/STA) of the reservation signal sending node, an attribute 630 associated with a communication role (e.g., a transmitter or a receiver) of the reservation sending node in the reserving TXOP, an attribute 632 associated with a node type of the listening node, an attribute 634 associated with a communication role of the listening node, an attribute 636 associated with a contention role of the listening node, and/or an attribute 638 associated with signal type (e.g., an RRQ/RTS or an RRS/CTS) of the incoming reservation signal. Mechanisms for determining of the LBT signal detection threshold 616 based on the attributes 620, 622, 624, 626, 628, 630, 632, 634, 636, 638 are discussed greater detail below in relation to FIGS. 9-13.

Figure 7:
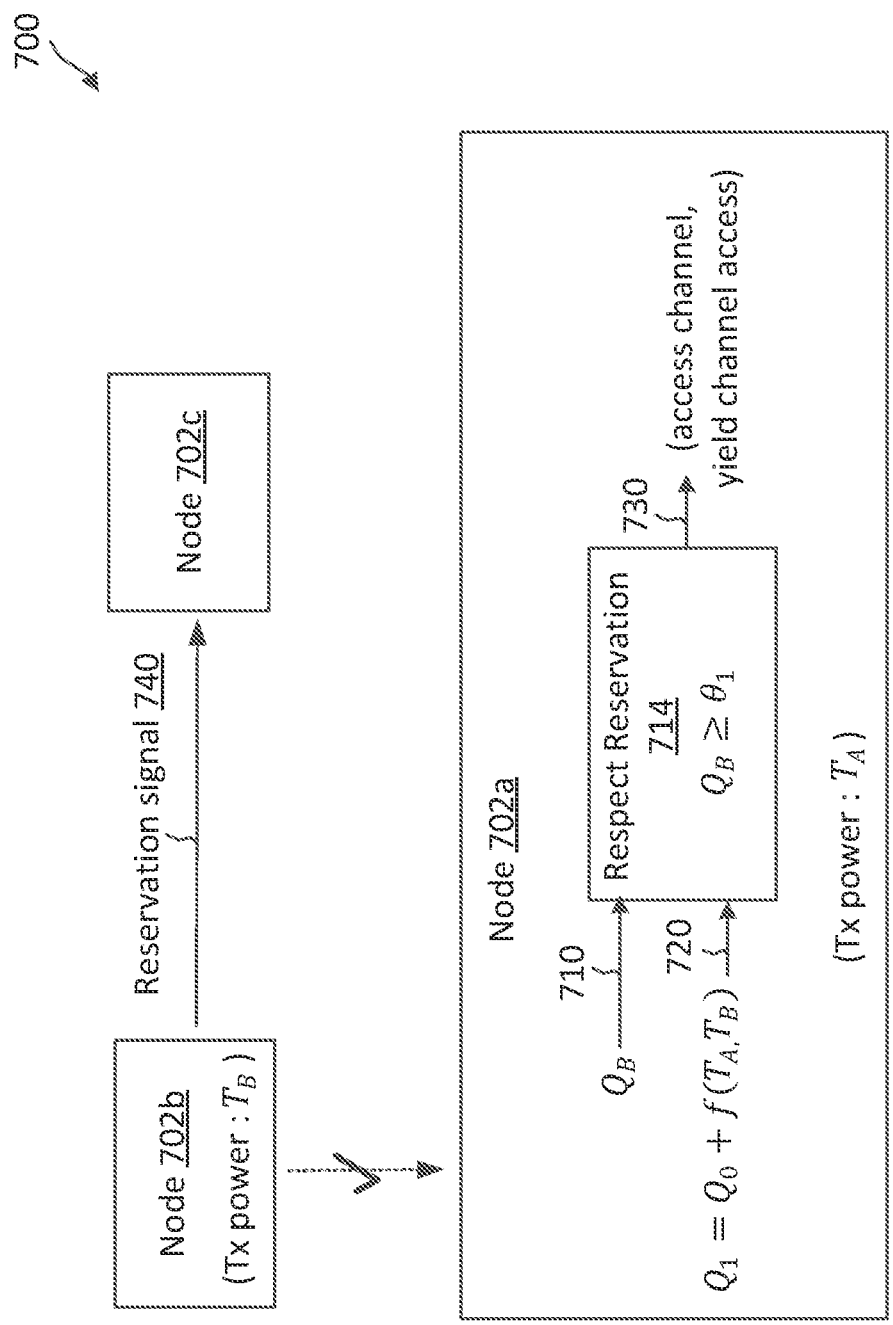
FIG. 7 illustrates an LBT signal detection threshold determination scheme according to some aspects of the present disclosure.

FIG. 7 illustrates an LBT signal detection threshold determination scheme 700 according to some aspects of the present disclosure. The scheme 700 may be employed by BSs such as the BSs 105 and 500, UEs such as the UEs 115 and 400, and nodes such as the nodes 202 and 302 in a network such as the network 100. In particular, a listening node contending for a TXOP in a shared channel (e.g., a shared frequency band or an unlicensed frequency band) may adjust an LBT signal detection threshold based on a transmit power of the listening node (e.g., the attribute 620 of FIG. 6) and a transmit power of a reservation signal sending node (e.g., the attribute 622 of FIG. 6) as shown in the scheme 700. The scheme 700 can be implemented by the LBT signal detection threshold determination component 612 of FIG. 6.

In the scheme 700, a listening node 702a (e.g., a BS 105 or 500, a UE 115 or 400, a node 202, or a node 302) may contend for a TXOP (e.g., the TXOP 208) in a medium (e.g., a shared frequency band or an unlicensed band). The listening node 702a may detect a reservation signal 740 transmitted by a reserving node 702b (e.g., a BS 105 or 500, a UE 115 or 400, a node 202, or a node 302) shown by the dotted arrow with the checkmark. In some instances, the reserving node 702b may be a reservation source node or an initiating node and the reservation signal 740 may be an RRQ signal (e.g., the RRQ signal 210) reserving a TXOP (e.g., the TXOP 208) for communicating with a node 702c (e.g., a BS 105 or 500, a UE 115 or 400, a node 202, or a node 302). In some other instances, the reserving node 702b may be a reservation destination node or a responding node and the reservation signal 740 may be an RRS signal (e.g., the RRS signal 220) transmitted in response to an RRQ signal received from a node 702c.

In the illustrated example of FIG. 7, the listening node 702a may transmit at a transmit (Tx) power, denoted as $T_A$, and the reservation sending node 702b may transmit at a transmit power, denoted as $T_B$. The listening node 702a may determine a received signal quality metric 710, denoted as $Q_B$, for the detected reservation signal 740. The received signal quality metric 710 may be similar to the received signal quality metric 602, for example, including a received signal power, a preamble SNR, or a preamble SINR. The listening node 702a may adjust a nominal LBT signal detection threshold, denoted as $\theta_0$, based on the listening node's transmit power $T_A$ and the reservation signal sending node's transmit power $T_B$. The nominal LBT signal detection threshold may be a predetermined threshold. For instances, all nodes operated by an operator or utilizing a certain radio access technology (RAT) may be preconfigured with the predetermined LBT signal detection threshold. The listening node 702a may adjust the nominal LBT signal detection threshold $\theta_0$ for determining whether to respect the reservation signal 740 as shown below:

$$\theta_1 = \theta_0 + f(T_B, T_A), \qquad (1)$$

where $\theta_1$ represents the adjusted LBT signal detection threshold 720 and $f(T_B, T_A)$ is a transmit power adjustment function or parameter dependent on the listening node's transmit power $T_A$ and the reservation signal sending node's transmit power $T_B$.

The listening node 702a may include a reservation respect component 714 similar to the reservation respect component 614. The reservation respect component 714 may include hardware and/or software components configured to determine whether the received signal quality metric $Q_B$ 710 is greater than or equal to the adjusted LBT signal detection threshold 720 $\theta_1$. If $Q_B \geq Q_1$, the reservation respect component 714 outputs a decision 730 not to access the channel. If $Q_B < Q_1$, the reservation respect component 714 outputs a decision 730 to access the channel.

Similarly, when the node 702b is a listening node and detected a reservation signal (e.g., the RRQ signal 210 or the RRS signal 220) transmitted by the node 702a, the node 702b may measure a received signal quality metric, denoted as $Q_A$, of the reservation signal. The received signal quality metric $Q_A$ measured at the node 702b may be similar to the received signal quality metric 602, for example, including a received signal power, a preamble SNR, or a preamble SINR. The node 702b may adjust the LBT nominal signal detection threshold $\theta_0$ for determining whether to respect the reservation signal transmitted by the node 702a as shown below:

$$\theta_{1b} = \theta_0 + f(T_A, T_B), \qquad (2)$$

where $\theta_{1b}$ represents the adjusted LBT signal detection threshold at the node 702b and $f(T_A, T_B)$ is a transmit power adjustment function or parameter dependent on the listening node's transmit power $T_A$ and the reservation signal sending node's transmit power $T_B$.

To achieve symmetric medium access irrespective of the listening node's transmit power $T_A$ or the reservation signal sending node's transmit power $T_B$, the LBT signal detection threshold adjustment may account for a pathloss between the node 702a and the node 702b. The symmetric medium access may refer to the node 702a and the node 702b having about the same silencing ability to silence each other. For instance, the received signal quality metric 710 of the reservation signal 740 measured at the node 702a can be expressed as shown below:

$$Q_B \sim T_B - L \qquad (3)$$

where L is the pathloss between the node 702a and the node 702b, for example, in units of decibels (dB). Similarly, the received signal quality metric of a reservation signal of the node 702a measured at the node 702b can be expressed as shown below:

$$Q_A \sim T_A - L. \qquad (4)$$

The symmetric silencing ability is provided when the following is satisfied:

$$Q_B = T_B - L \geq \theta_0 + f(T_B, T_A) \text{ if and only if } Q_A = T_A - L \geq \theta_0 + f(T_A, T_B). \qquad (5)$$

To achieve the symmetric silencing ability shown in equation (5), $f(T_B, T_A)$ and $f(T_A, T_B)$ can be configured as shown below:

$$f(T_B, T_A) = (T_B - T_A)/2,$$

$$f(T_A, T_B) = (T_A - T_B)/2. \qquad (6)$$

In some aspects, the node 702b may communicate transmit power information associated with the node 702b in the reservation signal 740. For example, the transmit power information may indicate a transmit power used by node 702b in transmitting the reservation signal 740. For instance, the reservation signal 740 may include an indication of the transmit power (e.g., in units of decibel-milliwatt (dBm)). Alternatively, the reservation signal 740 may include a lookup table index i. The index i may point to an entry in a transmit power lookup table. The transmit power lookup table may include a transmit power (e.g., in dBm) in each table entry. In general, the reservation signal 740 may indicate the transmit power $T_B$ in any suitable format.

In some aspects, the listening node 702a's transmit power $T_A$ and the reservation signal sending node 702b's transmit power $T_B$ may be represented by a power class of the listening node and a power class of the reservation sending node, respectively. In some aspects, the listening node 702a's transmit power $T_A$ and the reservation signal sending node 702b's transmit power $T_B$ may be represented by a maximum rated power (e.g., a peak transmit power) of the listening node and a maximum rated power of the reservation sending node, respectively. In some aspects, the listening node 702a's transmit power $T_A$ and the reservation signal sending node 702b's transmit power $T_B$ may be represented by a maximum output power of the listening node and a maximum output power of the reservation sending node, respectively. In some aspects, the listening node 702a's transmit power $T_A$ and the reservation signal sending node 702b's transmit power $T_B$ may be represented by a maximum effective isotropic radiated power (EIRP) of the listening node and a maximum EIRP of the reservation sending node, respectively. In some other aspects, the listening node 702a's transmit power $T_A$ and the reservation signal sending node 702b's transmit power $T_B$ can be determined based on a node type of the listening node and a node type of the reservation signal sending node. For instance, the node type may be a BS (e.g., the BSs 105 and/or 500) or a UE (e.g., the UEs 115 and/or 400). For example, a node may have a certain expected transmit power when the node is a BS. Similarly, a node may have a certain expected transmit power when the node is a UE. In some other instances, the node type may be an IEEE 802.11 access point (AP) or an IEEE 802.11 terminal station (STA). UE (e.g., the UEs 115 and/or 400). For example, a node may have a certain expected transmit power when the node is an AP. Similarly, a node may have a certain expected transmit power when the node is an STA.

Figure 8:
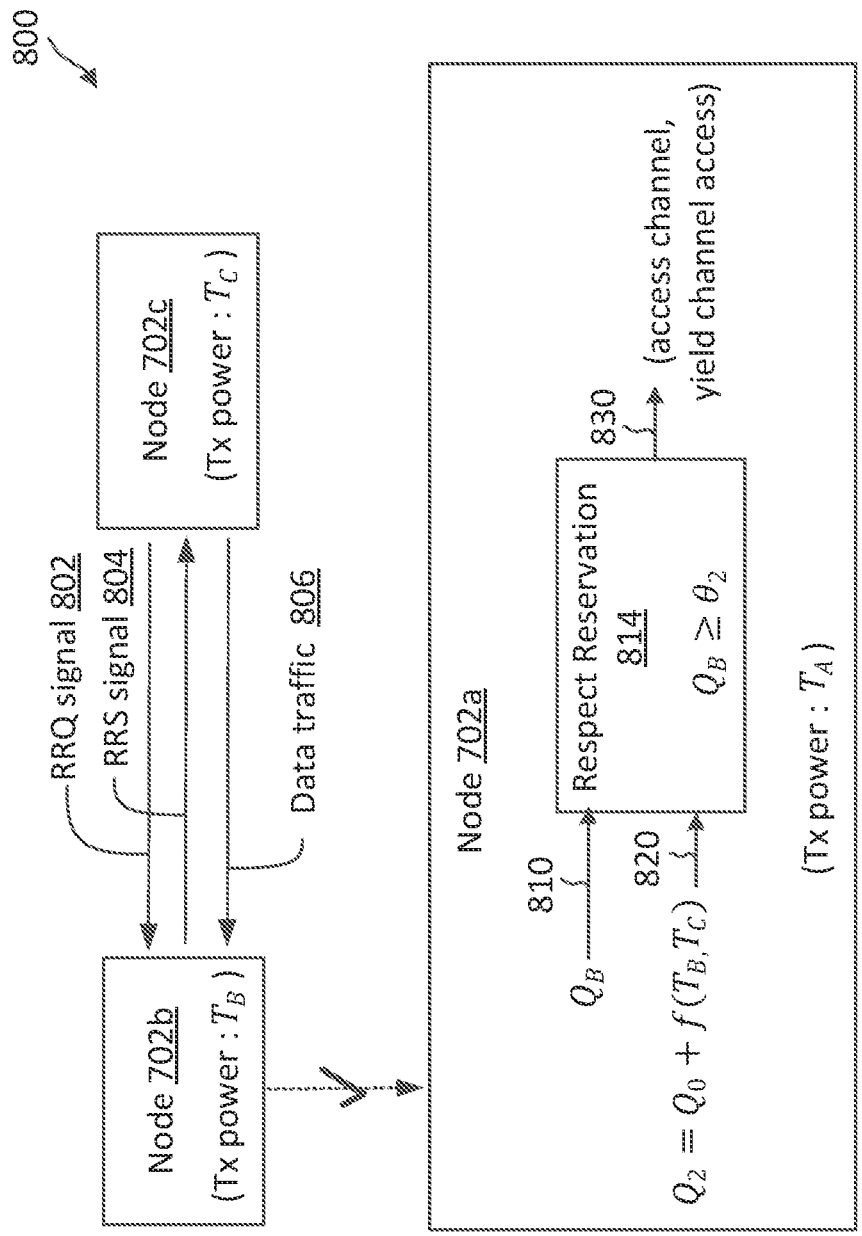
FIG. 8 illustrates an LBT signal detection threshold determination scheme according to some aspects of the present disclosure.

FIG. 8 illustrates an LBT signal detection threshold determination scheme 800 according to some aspects of the present disclosure. The scheme 800 may be employed by BSs such as the BSs 105 and 500, UEs such as the UEs 115 and 400, and nodes such as the nodes 202 and 302 in a network such as the network 100. In particular, a listening node contending for a TXOP in a shared channel (e.g., a shared frequency band or an unlicensed frequency band) may adjust an LBT signal detection threshold based on a transmit power of a reservation signal sending node (e.g., the attribute 622 of FIG. 6) and a transmit power of data traffic to be communicated in a TXOP (e.g., the TXOP 208) reserved by the reservation signal (e.g., the attribute 624 of FIG. 6) as shown in the scheme 800. The scheme 800 can be implemented by the LBT signal detection threshold determination component 612 of FIG. 6. The scheme 800 is described using a similar channel access scenario as in the scheme 800, where the node 702a detects a reservation signal of the node 702b during a channel contention, and may use the same reference numerals as in FIG. 7 for simplicity's sake.

In the illustrated example of FIG. 8, the node 702c transmits an RRQ signal 802 (e.g., the RRQ signal) to reserve a TXOP (e.g., the TXOP 208) for transmitting data traffic 806 to the node 702b. The node 702b responds to the RRQ signal 802 by transmitting an RRS signal 804 (e.g., the RRS signal 220) at the transmit power $T_B$. The node 702a may detect the RRS signal 804 transmitted by the node 702b (shown by the dotted arrow with the checkmark). The node 702a may measure a received signal quality metric 810 (e.g., RSSI or received signal power) of the RRS signal 804. The node 702c node may intend to occupy the TXOP using a transmit power, denoted as $T_C$, which may be different from the transmit power $T_B$ of the node 702b. Different transmit power $T_C$ may represent different interference impact in the TXOP. Thus, the received signal quality 810 (e.g., $Q_B$) of the RRS signal 804 measured at the listening node 702a may not be representative of the interference impact to the data traffic in the TXOP.

To consider the interference impact in the TXOP, the listening node 702a may use different signal detection thresholds to respect the RRS signal 804 for different transmit powers $T_C$. For instance, the listening node 702a may adjust the nominal LBT signal detection threshold $\theta_0$ based on the transmit power $T_B$ of the node 702b (that transmitted the RRS signal 804 detected by the node 702) and the transmit power $T_C$ of the node 702c (intending to occupy the TXOP) as shown below:

$$\theta_2=\theta_0+g(T_B,T_C), \quad (7)$$

where $\theta_2$ represents the adjusted LBT signal detection threshold 820 and $g(T_B,T_C)$ is a transmit power adjustment function or parameter dependent on the transmit power $T_B$ of the node 702b (that transmitted the RRS signal 804 detected by the node 702) and the transmit power $T_C$ of the node 702c (intending to occupy the TXOP).

The node 702c may include a reservation respect component 814 similar to the reservation respect components 614 and 714. The reservation respect component 814 is configured to determine whether the received signal quality metric 810, $Q_B$, is greater than or equal to the adjusted LBT signal detection threshold $\theta_2$. If $Q_B \geq \theta_2$, the reservation respect component 814 outputs a decision 830 not to access the channel. If $Q_B < \theta_2$, the reservation respect component 814 outputs a decision 830 to access the channel.

In some aspects, the higher the transmit power $T_C$ in the TXOP, the higher the interference tolerance. Thus, the LBT signal detection threshold $\theta_2$ may increase with the transmit power $T_C$ and decrease with the transmit power $T_B$. In some aspects, $g(T_B,T_C)$ can be defined as shown below:

$$g(T_B,T_C)=\alpha \times (T_C-T_B), \quad (8)$$

where $\alpha$ is a scaling factor, which may have any positive, zero or negative value. A special case for $\alpha$ is the proportional case where it takes a value 1.0. Accordingly, the nominal LBT signal detection threshold $\theta_0$ can be adjusted as shown below:

$$\theta_2=\theta_0+\alpha \times (T_C-T_B). \quad (9)$$

In some instances, the maximum adjustment applied to $\theta_0$ may further be limited by an upper limit and/or a lower limit.

In some aspects, the node 702b may communicate transmit power information associated with the node 702b and the node 702c (e.g., the transmitter of the data traffic in the TXOP) in the RRS signal 804. For example, the transmit power information may indicate a transmit power used by node 702b in transmitting the RRS signal 804 and a transmit power of the data traffic to be transmitted in the TXOP. For instance, the RRS signal 804 may include an indication of the transmit power $T_B$ and the transmit power $T_C$ (e.g., in dBm). Alternatively, the RRS signal 804 may include an index i for identifying the transit power $T_B$ from a lookup table and an index j for identifying the transit power $T_C$. The lookup table may include a transmit power (e.g., in dBm) in each entry.

In some aspects, the transmit power $T_B$ and power $T_C$ may indicate power classes of the nodes 702b and the node 702c, respectively. In some aspects, the transmit power $T_B$ and power $T_C$ may indicate maximum rated powers of the node 702b and the node 702c, respectively. In some aspects, the transmit power $T_B$ and power $T_C$ may indicate EIRPs of the node 702b and the node 702c, respectively. In some other aspects, the transmit power $T_B$ and power $T_C$ can be determined based on a node type of the node 702b and a node type of the node 702c, respectively, using similar mechanisms as discussed in FIG. 7.

FIGS. 9-13 are discussed in relation to FIG. 6 to illustrate mechanism for determining LBT signal detection thresholds to respect a detected reservation signal. The methods 900, 1000, 1100, 1200, and/or 1300 may be implemented by a listening node contending for access in the channel. The listening node may be similar to the UEs 115 and/or 400, the BSs 105 and/or 500, and/or the nodes 202, 302, and/or 702. In some instances, the listening node may correspond to the nodes 202c, 202d, or 702a discussed above. The listening node may implement the method 900, 1000, 1100, 1200, and/or 1300 while contending for access to a shared channel (e.g., a shared frequency band or an unlicensed band) and detecting a reservation signal (e.g., the RRQ signal 210 or the RRS signal 220) reserving a TXOP (e.g., the TXOP 208) in the channel.

Figures 9, 10:
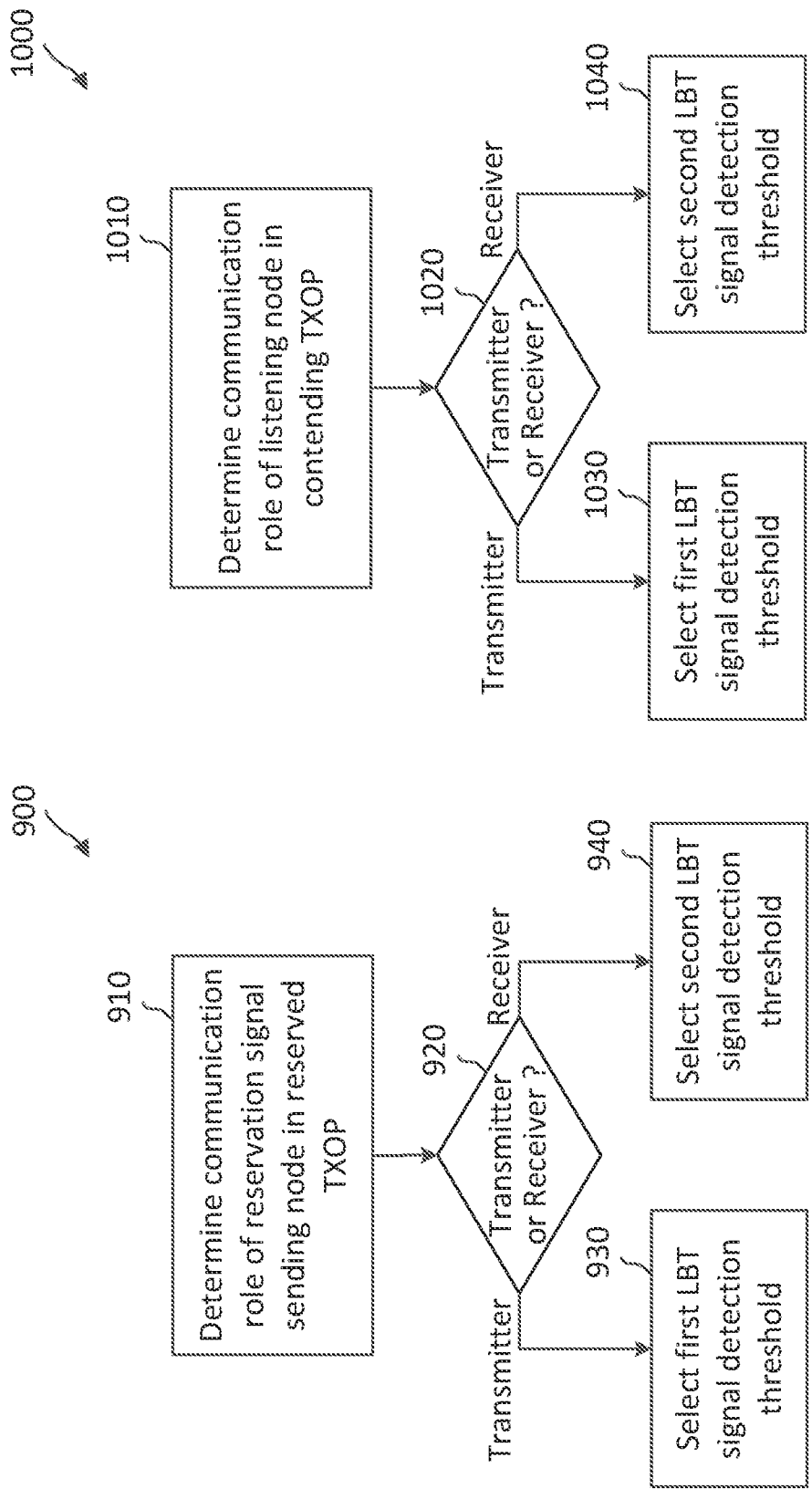
FIG. 9 is a flow diagram illustrating an LBT signal detection threshold determination method according to some aspects of the present disclosure.
FIG. 10 is a flow diagram illustrating an LBT signal detection threshold determination method according to some aspects of the present disclosure.

FIG. 9 is a flow diagram of an LBT signal detection threshold determination method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115 and/or 400 may utilize one or more components, such as the processor 402, the memory 404, the LBT module 408, the transceiver 410, the modem 412, and the one or more antennas 416, to execute the steps of method 900. Alternatively, a wireless communication device, such as the BSs 105 and/or 500 may utilize one or more components, such as the processor 502, the memory 504, the LBT module 508, the transceiver 510, the modem 512, and the one or more antennas 516, to execute the steps of method 900. In some instances, the method 900 may be implemented by an LBT signal detection threshold determination component such as the LBT signal detection threshold determination component 612 at a node such as the nodes 202, 302, and/or 702, the UEs 115 and/or 400, and/or the BSs 105 and/or 500. As illustrated, the method 900 includes a number of enumerated steps, but aspects of the method 900 may include additional steps before, after, and in between the enumerated steps. In some aspects, one or more of the enumerated steps may be omitted or performed in a different order. The method 900 may be implemented in conjunction with the schemes 600, 700, and/or 800 described above with reference to FIGS. 6, 7, and/or 8, respectively.

The method 900 may be implemented by a listening node contending for access in the channel. The listening node may be similar to the UEs 115 and/or 400, the BSs 105 and/or 500, and/or the nodes 202, 302, and/or 702. In the method 900, the listening node may change the decision to respect an incoming reservation signal based on whether the reservation signal sending node is a transmitter or a receiver in in the reserved TXOP (e.g., the attribute 630 of FIG. 6).

At block 910, the listening node determines a communication role of a sending node of the reservation signal in TXOP reserved by the reservation signal. The communication role can be a transmitter or a receiver. In some instances, the listening node may utilize one or more components, such as the processor 402 or 502, the LBT module 408 or 508, the transceiver 410 or 510, the modem 412 or 512, the one or more antennas 416 or 516, and/or the LBT signal detection threshold determination component 612, to decode reservation information from the reservation signal and determine the communication role of the reservation signal sending node in the reserved TXOP based on reservation information.

In some instances, the reservation sending node can be a reservation initiating node and a transmitter of primary data traffic in the reserved TXOP. For instance, the reservation sending node may be a BS (e.g., the BSs 105 and/or 500) reserving the TXOP for DL traffic communication with a UE (e.g., the UEs 115 and/or 400). In some instances, the reservation sending node can be a reservation initiating node and a receiver of primary data traffic in the reserved TXOP. For instance, the reservation sending node may be a BS (e.g., the BSs 105 and/or 500) reserving the TXOP for UL traffic communication with a UE (e.g., the UEs 115 and/or 400). In some instances, the reservation sending node can be a reservation responding node and a transmitter of primary data traffic in the reserved TXOP. For instance, the reservation sending node may be a UE (e.g., the UEs 115 and/or 400) responding to an RRQ signal (e.g., the RRQ signal 210) received from a BS (e.g., the BSs 105 and/or 500) reserving the TXOP for UL traffic communication. In some instances, the reservation sending node can be a reservation responding node and a receiver of primary data traffic in the reserved TXOP. For instance, the reservation sending node may be a UE (e.g., the UEs 115 and/or 400) responding to an RRQ signal (e.g., the RRQ signal 210) received from a BS (e.g., the BSs 105 and/or 500) reserving the TXOP for DL traffic communication.

At block 920, the listening node determines whether the reservation signal sending node is a transmitter or a receiver in the reserved TXOP. In some instances, the listening node may utilize one or more components, such as the processor 402 or 502, the LBT module 408 or 508, the transceiver 410 or 510, the modem 412 or 512, the one or more antennas 416 or 516, and/or the LBT signal detection threshold determination component 612, to read the reservation information carried in the reservation signal indicating whether the sending node is a transmitter or a receiver of primary data traffic in the reserved TXOP. If the reservation signal sending node is a transmitter in the upcoming reserved TXOP, the listening node proceeds to block 930.

At block 930, the listening node selects a first LBT signal detection threshold (e.g., the thresholds 616, 720, and/or 820) for determining whether to respect the detected reservation signal. In some instances, the listening node may store a table of LBT signal detection thresholds at a memory such as the memory 404 or 504 and may utilize one or more components, such as the processor 402 or 502, the LBT module 408 or 508, the transceiver 410 or 510, the modem 412 or 512, the one or more antennas 416 or 516, and/or the LBT signal detection threshold determination component 612, to retrieve the first LBT signal detection threshold from the table. Alternatively, the listening node may store a table of LBT signal detection threshold adjustment at the memory, retrieve a first adjustment from the table, and modify a nominal LBT signal detection threshold (e.g., a predetermined or preconfigured threshold discussed above) based on the first adjustment.

Returning to the block 920, if the reservation signal sending node is a receiver in the upcoming reserved TXOP, the listening node proceeds to block 940. At block 940, the listening node selects a second LBT signal detection threshold (e.g., the thresholds 616, 720, and/or 620) for determining whether to respect the detected reservation signal. In some instances, the listening node may store a table of LBT signal detection thresholds at a memory such as the memory 404 or 504 and may utilize one or more components, such as the processor 402 or 502, the LBT module 408 or 508, the transceiver 410 or 510, the modem 412 or 512, the one or more antennas 416 or 516, and/or the LBT signal detection threshold determination component 612, to retrieve the second LBT signal detection threshold from the table. Alternatively, the listening node may store a table of LBT signal detection threshold adjustment at the memory, retrieve a second adjustment from the table, and modify a nominal LBT signal detection threshold based on the second adjustment.

The second LBT signal detection threshold can be different from the first LBT signal detection threshold. For instance, to provide the receiver-centric medium access, the second LBT signal detection threshold used for respecting the reservation signal sending node as a receiver in the reserved TXOP can be higher than the first LBT signal detection threshold used for respecting the reservation signal sending node as a transmitter in the reserved TXOP.

In some aspects, the listening node may respect a reservation from a receiver in a TXOP, but may disregard a reservation from a transmitter in a TXOP. In other words, the listening node may utilize a substantially large value (e.g., an infinite value) for the LBT signal detection threshold. While this may cause a mismatch between transmit/receive silencing, however, the disregarding of a reservation from a transmitter can be practical in a mmWave unlicensed channel, where narrow directional beams are used for communications. For instance, the interference at a transmitter may be substantially different from interference at a receiver due to the use of the narrow directional beams.

In some aspects, the reservation signal sending node may include an indication of a communication role of the reservation node in the upcoming reserved TXOP. For instance, the indication may indicate a receiver or a transmitter. In some other instances, the indication may be in the form of a coded value where a value of 1 may indicate a transmitter role and a value of 0 may indicate a receiver role. Alternatively, the coded value may include a value of 1 indicating a receiver role and a value of 0 may indicate a transmitter role. In some other instances, the indication may be in the form of a lookup table index, where the lookup table index points to an entry in the table indicating a transmitter role or a receiver role.

In some aspects, the reservation signal sending node may be a transmitter and a receiver in the upcoming reserved TXOP. In other words, data traffic in the upcoming reserved TXOP is bi-directional. Thus, the listening node may further select an LBT signal detection threshold based on the bi-directional traffic in the upcoming reserved TXOP. For example, the primary data traffic may be communicated in one direction and control information (e.g., feedbacks) and/ or small-payload data can be communicated in a reverse direction during the TXOP. In some instances, the listening node may select the same second LBT signal detection threshold so that data reception at the reservation signal sending node during the upcoming reserved TXOP can be protected.

FIG. 10 is a flow diagram of an LBT signal detection threshold determination method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115 and/or 400 may utilize one or more components, such as the processor 402, the memory 404, the LBT module 408, the transceiver 410, the modem 412, and the one or more antennas 416, to execute the steps of method 1000. Alternatively, a wireless communication device, such as the BSs 105 and/or 500 may utilize one or more components, such as the processor 502, the memory 504, the LBT module 508, the transceiver 510, the modem 512, and the one or more antennas 516, to execute the steps of method 1000. In some instances, the method 1000 may be implemented by an LBT signal detection threshold determination component such as the LBT signal detection threshold determination component 612 at a node such as the nodes 202, 302, and/or 702, the UEs 115 and/or 400, and/or the BSs 105 and/or 500. As illustrated, the method 1000 includes a number of enumerated steps, but aspects of the method 1000 may include additional steps before, after, and in between the enumerated steps. In some aspects, one or more of the enumerated steps may be omitted or performed in a different order. The method 1000 may be implemented in conjunction with the schemes 600, 700, and/or 800 described above with reference to FIGS. 6, 7, and/or 8, respectively, and/or the method 900 described above with reference to FIG. 9.

The method 1000 may be implemented by a listening node contending for access in the channel. The listening node may be similar to the UEs 115 and/or 400, the BSs 105 and/or 500, and/or the nodes 202, 302, and/or 702. The method 1000 may change the decision to respect a detected reservation signal based on whether the listening node is contending a TXOP as a transmitter or a receiver in in the reserved TXOP (e.g., the attribute 634 of FIG. 6).

Generally speaking, the method 1000 includes features similar to method 900 in many respects. For example, blocks 1020, 1030, and 1040 are similar to blocks 920, 930, and 940, respectively. Accordingly, for sake of brevity, details of those blocks will not be repeated here. Please refer to the corresponding descriptions above.

At block 1010, the listening node determines a communication role of the listening node in a TXOP for the listening node's contention. The communication role can be a transmitter or a receiver. The listening node may be aware of its communication role for the contention. In some instances, the listening node can be a reservation initiating node contending for a TXOP and a transmitter of primary data traffic in the contending TXOP (e.g., upon a successful contention). For instance, the listening node may be a BS (e.g., the BSs 105 and/or 500) contending for a TXOP for DL traffic communication with a UE (e.g., the UEs 115 and/or 400). In some instances, the listening node can be a reservation initiating node and a receiver of primary data traffic in the contending TXOP. For instance, the listening node may be a BS (e.g., the BSs 105 and/or 500) contending for a TXOP for UL traffic communication with a UE (e.g., the UEs 115 and/or 400). In some instances, the listening node can be a reservation responding node and a transmitter of primary data traffic in the contending TXOP. For instance, the reservation sending node may be a UE (e.g., the UEs 115 and/or 400) responding to an RRQ signal (e.g., the RRQ signal 210) received from a BS (e.g., the BSs 105 and/or 500) reserving a TXOP for UL traffic communication. In some instances, the listening node can be a reservation responding node and a receiver of primary data traffic in the reserved TXOP. For instance, the listening node may be a UE (e.g., the UEs 115 and/or 400) responding to an RRQ signal (e.g., the RRQ signal 210) received from a BS (e.g., the BSs 105 and/or 500) reserving a TXOP for DL traffic communication.

When the listening node is a reservation initiating node, the communication role of the listening node is known. When the listening node is a reservation responding node, the communication role of the listening node can be indicated in an RRQ signal that the listening node is responding to. For instance, the RRQ signal may include an indication of a communication role of the listening node for a contending TXOP. For instance, the indication may indicate a traffic direction, for example, whether the listening node is to be a receiver or a transmitter. In some other instances, the indication may be in the form of a coded value where a value of 1 may indicate a transmitter role and a value of 0 may indicate a receiver role. Alternatively, the coded value may include a value of 1 indicating a receiver role and a value of 0 may indicate a transmitter role. In some other instances, the indication may be in the form of a lookup table index, where the lookup table index points to an entry in the table indicating a transmitter role or a receiver role.

In some aspects, when the listening node is a transmitter in the contending TXOP, the listening node may perform a backoff (e.g., a random backoff), upon a determination to respect the detected reservation signal (based on the selected threshold), before reattempting to contend for access in the channel.

In some aspects, when the listening node is a receiver in the contending TXOP (responding to an RRQ signal), the listening node may not backoff upon a determination to respect the detected reservation signal. The listening node may proceed to transmit an RRS signal if the network allows for high interference or a lower MCS order in return for a higher likelihood of channel access. For instance, the listening node may be a BS (e.g., the BSs 105 and/or 500) and may contend for access in the channel for a UL-centric TXOP. The BS select a low-order MCS for UL communication in return for no backoff upon a detection of a busy channel. Alternatively, the listening node may be a UE (e.g., the UEs 115 and/or 400) and may contend for access in the channel for a DL-centric TXOP with a fast channel-state-information (CSI) reporting to enable MCS determination at a serving BS.

In some aspects, the listening node may be a transmitter and a receiver in the upcoming reserved TXOP. In other words, data traffic in the upcoming reserved TXOP is bi-directional. Thus, the listening node may further select an LBT signal detection threshold based on the bi-directional traffic in the upcoming reserved TXOP. For example, the primary data traffic may be communicated in one direction and control information (e.g., feedbacks) and/or small-payload data can be communicated in a reverse direction during the TXOP. In some instances, the listening node may select the same second LBT signal detection threshold so that data reception at the listening node during the upcoming reserved TXOP can be protected.

In some aspects, the listening node may further determine the LBT signal detection threshold based on a contention role of the listening node (e.g., the attribute 636 of FIG. 6). For instance, the listening node may be UE and a reservation responding node contending for a TXOP of a scheduled transmission (scheduled by a corresponding reservation initiating node). Alternatively, the listening node may be UE and a reservation initiating node contending for a TXOP of an autonomous UL transmission. Thus, the listening node may select a different LBT signal detection threshold when the listening node's contention is for a scheduled transmission than when the listening node's contention is for an autonomous transmission. In some aspects, the listening node may utilize a stricter (lower) LBT signal detection threshold when the contention is for an autonomous transmission than for a scheduled transmission. In some instances, for a scheduled transmission, the listening node may be configured (e.g., by a BS) to utilize a more relaxed (higher) LBT signal detection threshold, different LBT mechanisms (e.g., CAT2 LBT) or no threshold (e.g., an infinite value). In some other aspects, the listening node may utilize a higher LBT signal detection threshold when the contention is for an autonomous transmission to increase the chance of the listening node in gaining access to the channel.

Figures 11, 12:
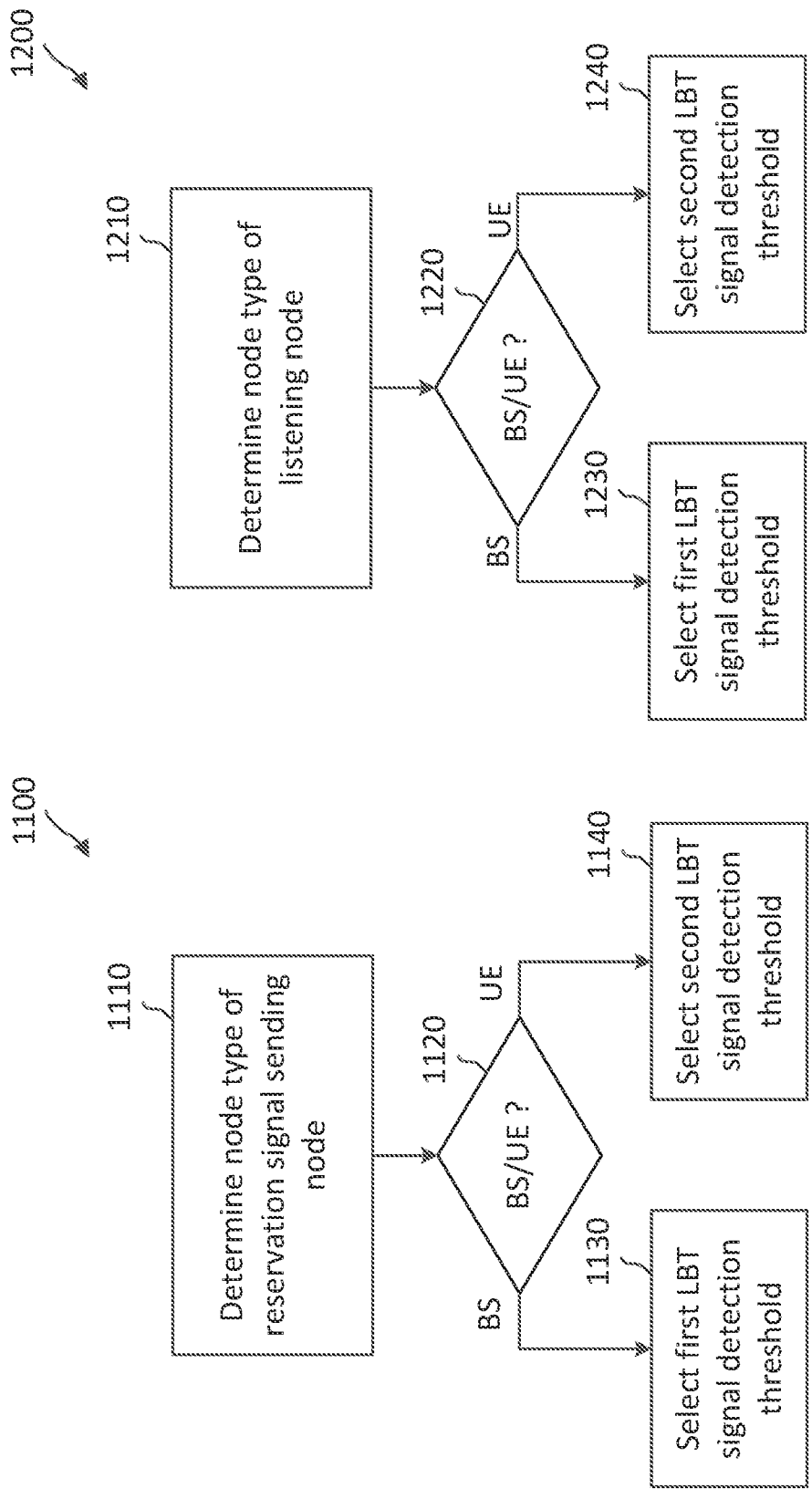
FIG. 11 is a flow diagram illustrating an LBT signal detection threshold determination method according to some aspects of the present disclosure.
FIG. 12 is a flow diagram illustrating an LBT signal detection threshold determination method according to some aspects of the present disclosure.

FIG. 11 is a flow diagram of an LBT signal detection threshold determination method 1100 according to some aspects of the present disclosure. Aspects of the method 1100 can be executed by a computing device (e.g., a processor, processing circuit, and/or other suitable component) of a wireless communication device or other suitable means for performing the steps. For example, a wireless communication device, such as the UEs 115 and/or 400 may utilize one or more components, such as the processor 402, the memory 404, the LBT module 408, the transceiver 410, the modem 412, and the one or more antennas 416, to execute the steps of method 1100. Alternatively, a wireless communication device, such as the BSs 105 and/or 500 may utilize one or more components, such as the processor 502, the memory 504, the LBT module 508, the transceiver 510, the modem 512, and the one or more antennas 516, to execute the steps of method 1100. In some instances, the method 1100 may be implemented by an LBT signal detection threshold determination component such as the LBT signal detection threshold determination component 612 at a node such as the nodes 202, 302, and/or 702, the UEs 115 and/or 400, and/or the BSs 105 and/or 500. As illustrated, the method 1100 includes a number of enumerated steps, but aspects of the method 1100 may include additional steps before, after, and in between the enumerated steps. In some aspects, one or more of the enumerated steps may be omitted or performed in a different order. The method 1100 may be implemented in conjunction with the schemes 600, 700, and/or 800 described above with reference to FIGS. 6, 7, and/or 8, respectively, and/or the methods 900 and/or 1000 described above with reference to FIGS. 9 and/or 10, respectively.

The method 1100 may be implemented by a listening node contending for access in the channel. The listening node may be similar to the UEs 115 and/or 400, the BSs 105 and/or 500, and/or the nodes 202, 302, and/or 702. In some instances, the listening node may correspond to the nodes 202c, 202d, or 702a discussed above. The method 1100 may change the decision to respect a detected reservation signal based on whether the reservation signal sending node is a BS or a UE (e.g., the attribute 628 of FIG. 6).

At block 1110, the listening node determines a node type of a sending node of the detected reservation signal. The node type may indicate whether the reservation sending node is a BS or a UE. In some instances, the listening node may utilize one or more components, such as the processor 402 or 502, the LBT module 408 or 508, the transceiver 410 or 510, the modem 412 or 512, the one or more antennas 416 or 516, and/or the LBT signal detection threshold determination component 612, to decode reservation information from the reservation signal and determine the node type of the reservation signal sending node in the reserved TXOP based on reservation information.

At block 1120, the listening node determines whether the reservation signal sending node is a BS or a UE In some instances, the listening node may utilize one or more components, such as the processor 402 or 502, the LBT module 408 or 508, the transceiver 410 or 510, the modem 412 or 512, the one or more antennas 416 or 516, and/or the LBT signal detection threshold determination component 612, to read the reservation information carried in the reservation signal indicating whether the sending node is BS or a UE. If the reservation signal sending node is a BS, the listening node proceeds to block 1130.

At block 1130, the listening node selects a first LBT signal detection threshold (e.g., the threshold 616) for determining whether to respect the detected reservation signal, for example, using substantially similar mechanisms as discussed above at block 930 of the method 900.

Returning to the block 1120, if the reservation signal sending node is a UE, the listening node proceeds to block 1140. At block 1140, the listening node selects a second LBT signal detection threshold (e.g., the threshold 616) for determining whether to respect the detected reservation signal, for example, using similar mechanisms discussed above at block 930 of the method 900. The second LBT signal detection threshold is different form the first LBT signal detection threshold. In some instance, the listening node may adjust a nominal LBT signal detection threshold differently to result in the first LBT signal detection threshold or the second LBT signal detection threshold.

Different types of nodes may have different capabilities for processing reception or transmission of reservation signals. For instance, a BS may have more antennas, a lower noise figure, and/or a higher signal transmission/reception bandwidth than a UE, and thus may have different signal transmission and/or signal reception capabilities than a UE. As such, different LBT signal detection thresholds can be used based on whether the reservation signal sending node is a BS or a UE. For instance, a BS having a higher interference tolerance than a UE. Thus, the listening node may utilize a higher LBT signal detection thresholds when the reservation signal sending node is a BS than when the reservation signal sending node is a UE.

While the method 1100 is described in the context of selecting different LBT signal detection thresholds based on whether the reservation signal sending node is a BS or a UE, similar mechanisms may be applied to select different LBT signal detection thresholds for an IEEE 802.11 AP (e.g., similar to a BS) and an IEEE 802.11 STA (e.g., similar to a UE).

FIG. 12 is a flow diagram of an LBT signal detection threshold determination method 1200 according to some aspects of the present disclosure. Aspects of the method 1200 can be executed by a computing device (e.g., a processor, processing circuit, and/or other suitable component) of a wireless communication device or other suitable means for performing the steps. For example, a wireless communication device, such as the UEs 115 and/or 400 may utilize one or more components, such as the processor 402, the memory 404, the LBT module 408, the transceiver 410, the modem 412, and the one or more antennas 416, to execute the steps of method 1200. Alternatively, a wireless communication device, such as the BSs 105 and/or 500 may utilize one or more components, such as the processor 502, the memory 504, the LBT module 508, the transceiver 510, the modem 512, and the one or more antennas 516, to execute the steps of method 1200. In some instances, the method 1200 may be implemented by an LBT signal detection threshold determination component such as the LBT signal detection threshold determination component 612 at a node such as the nodes 202, 302, and/or 702, the UEs 115 and/or 400, and/or the BSs 105 and/or 500. As illustrated, the method 1200 includes a number of enumerated steps, but aspects of the method 1200 may include additional steps before, after, and in between the enumerated steps. In some aspects, one or more of the enumerated steps may be omitted or performed in a different order. The method 1200 may be implemented in conjunction with the schemes 600, 700, and/or 800 described above with reference to FIGS. 6, 7, and/or 8, respectively, and/or the methods 900, 1000, and/or 1100 described above with reference to FIGS. 9, 10, and/or 11, respectively.

The method 1200 may be implemented by a listening node contending for access in the channel. The listening node may be similar to the UEs 115 and/or 400, the BSs 105 and/or 500, and/or the nodes 202, 302, and/or 702. In some instances, the listening node may correspond to the nodes 202c, 202d, or 702a discussed above. The method 1100 may change the decision to respect a detected reservation signal based on whether the listening node is a BS or a UE (e.g., the attribute 628 of FIG. 6). Alternatively, in the context of IEEE 802.11, the listening node may change the decision to respect a detected reservation signal based on whether the listening node is an IEEE 802.11 AP or an IEEE 802.11 STA.

Generally speaking, the method 1200 includes features similar to 1200 in many respects. For example, blocks 1220, 1230, and 1240 are similar to blocks 1120, 1130, and 1140, respectively. Accordingly, for sake of brevity, details of those blocks will not be repeated here. Please refer to the corresponding descriptions above.

At block 1210, the listening node determines a node type of a sending node of the detected reservation signal. The node type may indicate whether the reservation sending node is a BS or a UE. The node type of the listening node is known to the listening node. While the method 1200 is described in the context of selecting different LBT signal detection thresholds based on whether the reservation signal sending node is a BS or a UE, similar mechanisms may be applied to select different LBT signal detection thresholds for an IEEE 802.11 AP (e.g., similar to a BS) and an IEEE 802.11 STA (e.g., similar to a UE).

In some instances, when the listening node is a UE, the listening node may not be capable of processing or decoding the reservation signal within a certain time limit, and thus the listening node may not respect any reservation signal. This is equivalent to the listening node utilizing a large value for the LBT signal detection threshold.

Figure 13:
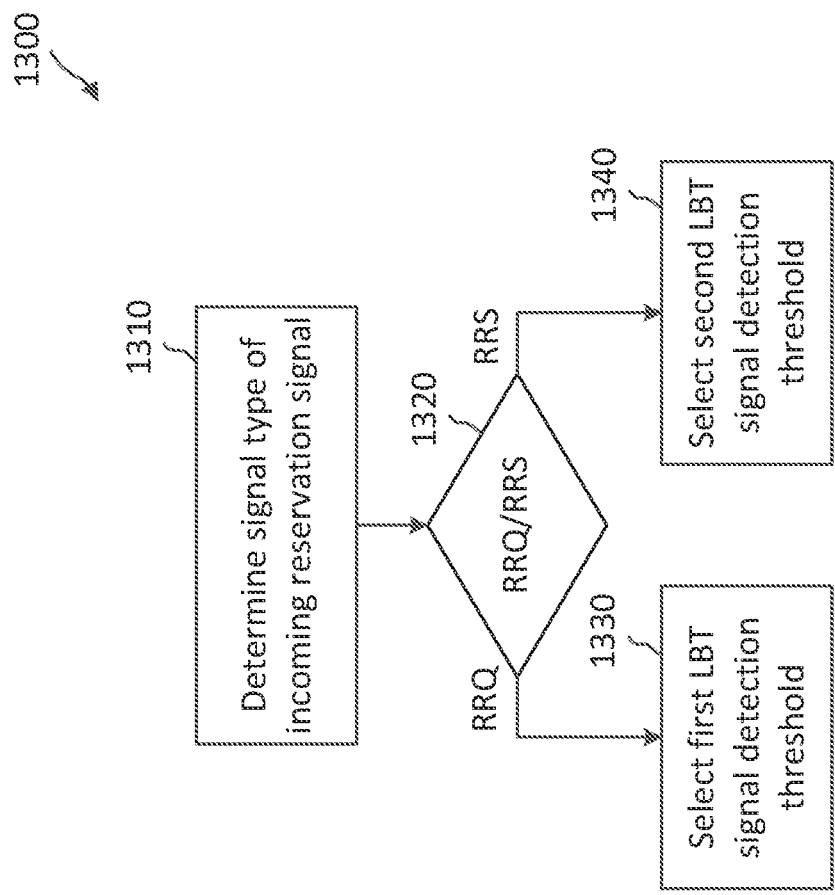
FIG. 13 is a flow diagram illustrating an LBT signal detection threshold determination method according to some aspects of the present disclosure.

FIG. 13 is a flow diagram of an LBT signal detection threshold determination method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the UEs 115 and/or 400 may utilize one or more components, such as the processor 402, the memory 404, the LBT module 408, the transceiver 410, the modem 412, and the one or more antennas 416, to execute the steps of method 1300. Alternatively, a wireless communication device, such as the BSs 105 and/or 500 may utilize one or more components, such as the processor 502, the memory 504, the LBT module 508, the transceiver 510, the modem 512, and the one or more antennas 516, to execute the steps of method 1300. In some instances, the method 1300 may be implemented by an LBT signal detection threshold determination component such as the LBT signal detection threshold determination component 612 at a node such as the nodes 202, 302, and/or 702, the UEs 115 and/or 400, and/or the BSs 105 and/or 500. As illustrated, the method 1300 includes a number of enumerated steps, but aspects of the method 1300 may include additional steps before, after, and in between the enumerated steps. In some aspects, one or more of the enumerated steps may be omitted or performed in a different order. The method 1300 may be implemented in conjunction with the schemes 600, 700, and/or 800 described above with reference to FIGS. 6, 7, and/or 8, respectively, and/or the methods 900, 1000, 1100, and/or 1200 described above with reference to FIGS. 9, 10, 11, and/or 12, respectively.

The method 1300 may be implemented by a listening node contending for access in the channel. The listening node may be similar to the UEs 115 and/or 400, the BSs 105 and/or 500, and/or the nodes 202, 302, and/or 702. In some instances, the listening node may correspond to the nodes 202c, 202d, or 702a discussed above. The method 1300 may change the decision to respect a detected reservation signal based on whether the detected reservation signal is an RRQ signal (e.g., the RRQ signal 210) or an RRS signal (e.g., the RRS signal 220) similar to the attribute 638 of FIG. 6.

At block 1310, the listening node determines a signal type of the detected reservation signal. The signal type may indicate whether the reservation signal is an RRQ signal transmitted by a reservation initiating node or an RRS signal transmitted by a reservation responding node. In some instances, the listening node may utilize one or more components, such as the processor 402 or 502, the LBT module 408 or 508, the transceiver 410 or 510, the modem 412 or 512, the one or more antennas 416 or 516, and/or the LBT signal detection threshold determination component 612, to determine whether the detected reservation signal is an RRQ signal or an RRS signal. In some instances, an RRQ signal may include a different preamble than an RRS signal, and thus the listening node may determine the node type based on the detected preamble. In some instances, the detected reservation signal may include an indication indicating whether the reservation signal is an RRQ signal or an RRS signal or an indication indicating whether the reservation signal sending node is a reservation initiating node or a reservation responding node.

At block 1320, the listening node determines whether the reservation signal is an RRQ signal transmitted by a reservation initiating node or an RRS signal transmitted by a reservation responding node. In some instances, the listening node may utilize one or more components, such as the processor 402 or 502, the LBT module 408 or 508, the transceiver 410 or 510, the modem 412 or 512, the one or more antennas 416 or 516, and/or the LBT signal detection threshold determination component 612, to determine the detection is based on a successful RRQ decoding or a successful RRS decoding or read the reservation information carried in the reservation signal. If the reservation signal is an RRQ signal, the listening node proceeds to block 1330.

At block 1330, the listening node selects a first LBT signal detection threshold (e.g., the threshold 616) for determining whether to respect the detected reservation signal, for example, using substantially similar mechanisms as discussed above at block 930 of the method 900.

Returning to the block 1320, if the reservation signal is an RRS signal, the listening node proceeds to block 1340. At block 1340, the listening node selects a second LBT signal detection threshold (e.g., the threshold 616) for determining whether to respect the detected reservation signal, for example, using similar mechanisms discussed above at block 930 of the method 900. The second LBT signal detection threshold is different from the first LBT signal detection threshold. In some instance, the listening node may adjust a nominal LBT signal detection threshold differently to result in the first LBT signal detection threshold or the second LBT signal detection threshold.

In some aspects, reservations from RRQ signals may occur more often than RRS signals since not all RRQ signals may be responded by a corresponding reservation responding node. As such, to reduce over-silencing caused by RRQ signals, the listening node can configure the first LBT signal detection threshold for the RRQ signal to be higher than the second LBT signal detection threshold for the RRS signal. In some instances, in a highly beamformed system where narrow directional beams are used for communication, the listening node may utilize a substantially large value (e.g., an infinite value) for the LBT signal detection threshold. In other words, the listening node may disregard reservations from a reservation initiating node.

While the method 1300 is described in the context of selecting different LBT signal detection thresholds based on whether the reservation signal is an RRQ signal or an RRS signal, similar mechanisms may be applied to select different LBT signal detection thresholds for an RTS signal and an CTS signal.

In general, a listening node (e.g., the UEs 115 and/or 400, the BSs 105 and/or 500, and/or the nodes 202, 302, and/or 702) may utilize any suitable combination of the schemes 700 and/or 800 discussed above with reference to FIGS. 7 and/or 8, respectively, and/or the methods 900, 1000, 1100, 1200, and/or 1300 discussed above with reference to FIGS. 9, 10, 11, 12, and/or 13, respectively, to determine an LBT signal detection threshold (e.g., the threshold 616) for channel access.

Figure 14:
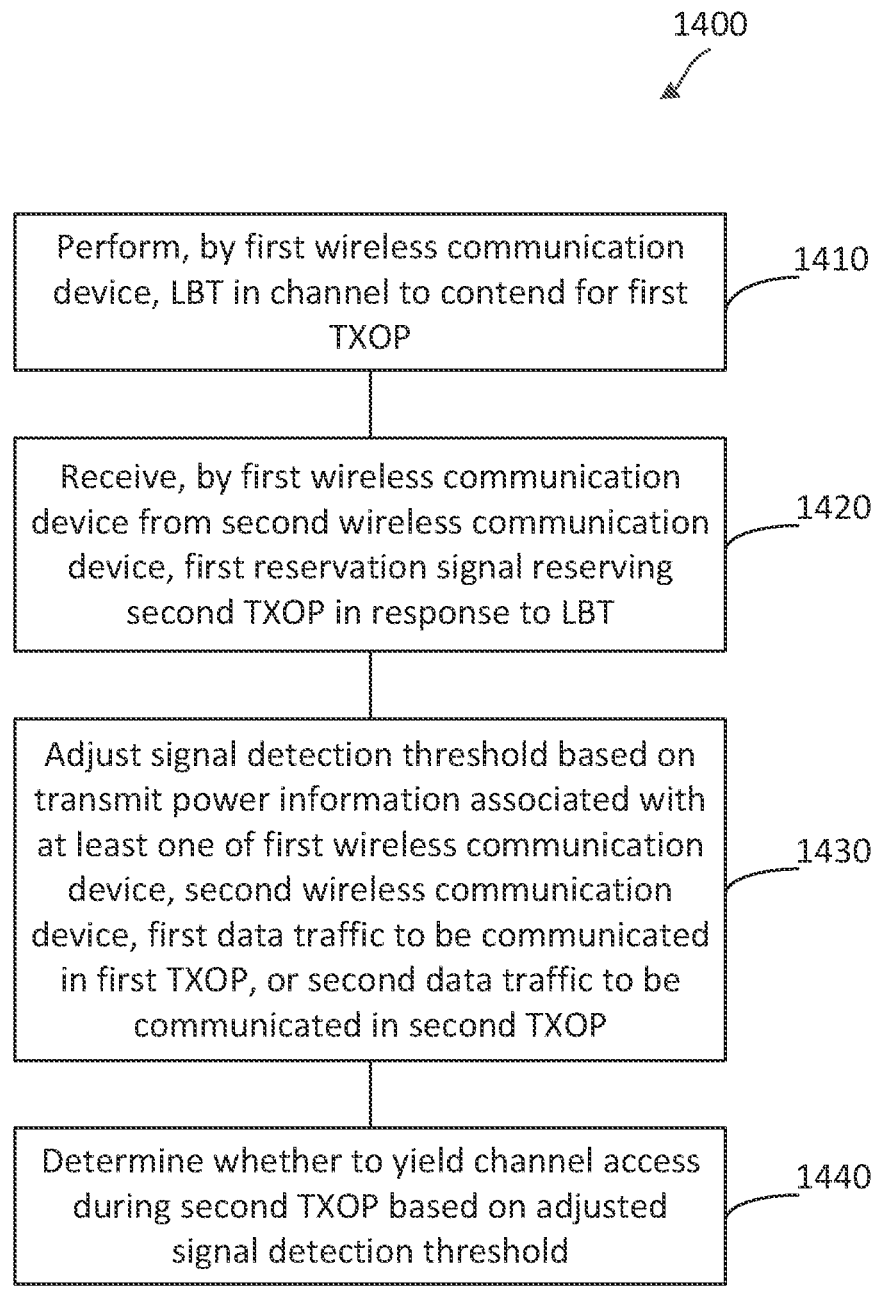
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the UEs 115 and/or 400 and/or the nodes 202, 302, and/or 702, may utilize one or more components, such as the processor 402, the memory 404, the LBT module 408, the transceiver 410, the modem 412, and the one or more antennas 416, to execute the steps of method 1400. Alternatively, a wireless communication device, such as the BSs 105 and/or 500 and/or the nodes 202, 302, and/or 702, may utilize one or more components, such as the processor 502, the memory 504, the LBT module 508, the transceiver 510, the modem 512, and the one or more antennas 516, to execute the steps of method 1400. The method 1400 may employ similar mechanisms as in the schemes 700 and/or 800 discussed above with reference to FIGS. 7 and/or 8, respectively. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a first wireless communication device performs an LBT (e.g., the LBT 205) in a channel to contend for a first TXOP (e.g., the TXOP 208). The channel can be a shared frequency band or an unlicensed band. In some instances, the listening node may utilize one or more components, such as the processor 402 or 502, the LBT module 408 or 508, the transceiver 410 or 510, the modem 412 or 512, the one or more antennas 416 or 516, and/or the channel access determination component 610, to perform the LBT by monitoring signals in the channel and performing RRS decoding and/or RRQ decoding and/or preamble detection on signals received from the channel.

At block 1420, the first wireless communication device receives, from a second wireless communication device, a first reservation signal (e.g., an RRQ signal 210 or an RRS signal 220) reserving a second TXOP in the channel in response to the LBT, where the second TXOP is different from the first TXOP. In some instances, the listening node may utilize one or more components, such as the processor 402 or 502, the LBT module 408 or 508, the transceiver 410 or 510, the modem 412 or 512, the one or more antennas 416 or 516, and/or the channel access determination component 610, to receive the first reservation signal by receiving a signal from the channel, performing RRS decoding and/or RRQ decoding on received signal, and determining that the received signal is a reservation signal.

In some aspects, the first wireless communication may correspond to one of a BS (e.g., an NR-U BS) or a UE (e.g., an NR-U UE), and the second wireless communication device may correspond to a different one of the BS or the UE. In some aspects, the first wireless communication may correspond to one of an AP (e.g., an IEEE 802.11 AP) or an STA (e.g., an IEEE 802.11 STA), and the second wireless communication device may correspond to a different one of the AP or the STA.

At block 1430, the first wireless communication device adjusts a signal detection threshold based on transmit power information associated with at least one of the first wireless communication device, the second wireless communication device, first data traffic to be communicated in the first TXOP, or second data traffic to be communicated in the second TXOP. In some instances, the listening node may utilize one or more components, such as the processor 402 or 502, the LBT module 408 or 508, the transceiver 410 or 510, the modem 412 or 512, the one or more antennas 416 or 516, and/or the channel access determination component 610, to adjust the signal detection threshold based on the transmit power information associated with the at least one of the first wireless communication device, the second wireless communication device, the first data traffic to be communicated in the first TXOP, or second data traffic to be communicated in the second TXOP.

In some aspects, the signal detection threshold may correspond to a nominal LBT signal detection threshold (e.g., a threshold preconfigured based on an operator that operates the first wireless communication and/or a RAT in use). In some aspects, the first wireless communication device may adjust the LBT signal detection threshold based on first transmit power information (e.g., $T_A$) associated with the first wireless communication device and second transmit power information (e.g., $T_B$) associated with the second wireless communication device, for example, similar to the scheme 700 described above with reference to FIG. 7. In some instances, the adjustment may be based on a difference between a first transmit power associated with the first wireless communication device and a second transmit power associated with the second wireless communication device, for example, as shown in equation (6) discussed above.

In some aspects, the first wireless communication device may adjust the LBT signal detection threshold based on first transmit power information (e.g., $T_B$) associated with the second wireless communication device and second transmit power information (e.g., $T_C$) associated with the second data traffic, for example, similar to the scheme 800 described above with reference to FIG. 8. In some aspects, the first wireless communication device may adjust LBT signal detection threshold. In some instances, the adjustment may be based on a difference between a first transmit power associated with the second wireless communication device and a second transmit power associated with the second data traffic, for example, as shown in equations (8) or (9) discussed above.

At block 1440, the first wireless communication device determines whether to yield channel access during the second TXOP based on a comparison of a signal measurement (e.g., the reservation signal receive quality metric 602, 710, and/or 810) of the first reservation signal and the adjusted signal detection threshold (e.g., the thresholds 616, 720, and/or 820). In some instances, the listening node may utilize one or more components, such as the processor 402 or 502, the LBT module 408 or 508, the transceiver 410 or 510, the modem 412 or 512, the one or more antennas 416 or 516, and/or the channel access determination component 610, to determine whether to yield channel access during the second TXOP based on whether the signal measurement exceeds the adjusted signal detection threshold.

In some aspects, the first wireless communication device may communicate, with a third wireless communication device, the first data traffic during the first TXOP overlapping with at least a portion of the second TXOP in response to determining not to yield channel access during the second TXOP at block 1440, for example, when the signal measurement is lower than the adjusted signal detection threshold. In some other aspects, the first wireless communication device may refrain from communicating during the second TXOP in response to determining to yield channel access during the second TXOP at block 1440, for example, when the signal measurement is greater than the adjusted signal detection threshold.

Figure 15:
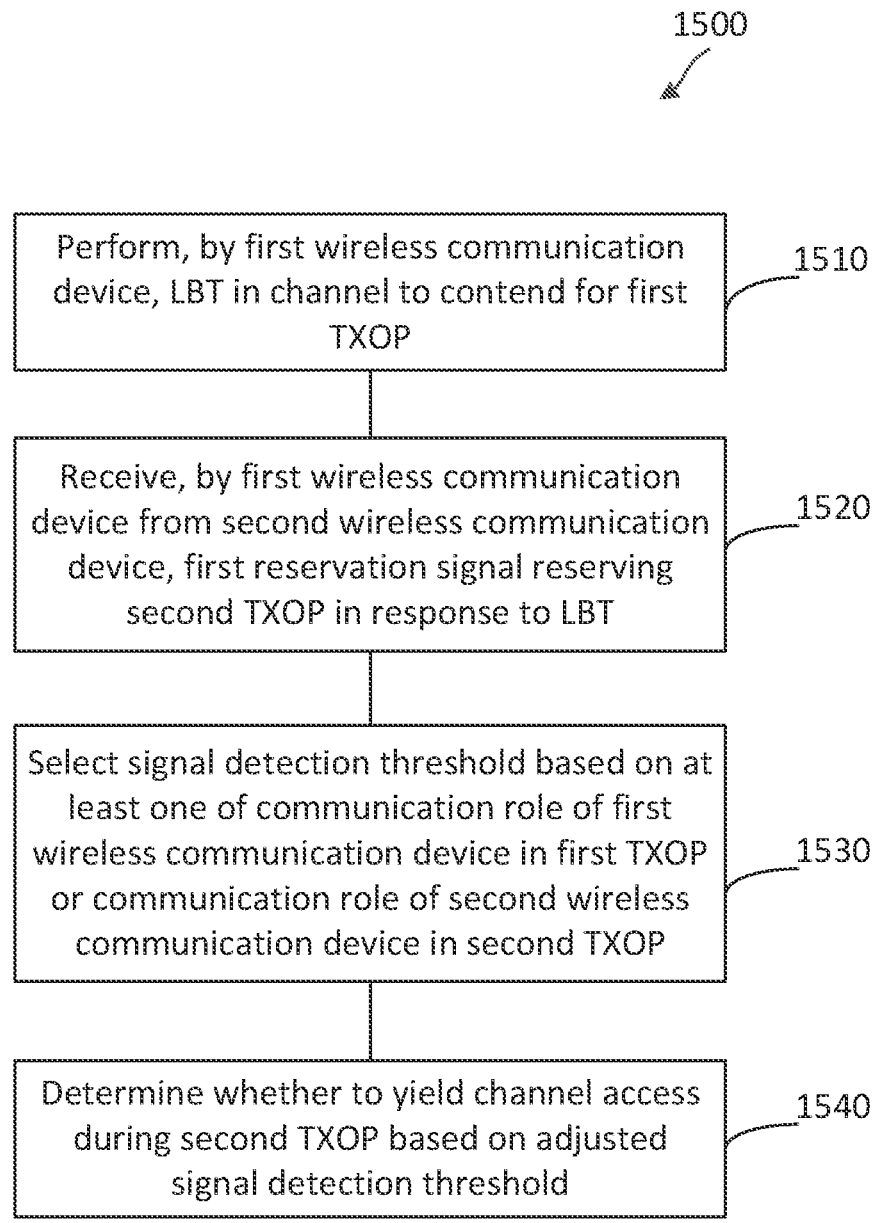
FIG. 15 is a flow diagram of a wireless communication method according to some aspects of the present disclosure.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as the UEs 115 and/or 400 and/or the nodes 202, 302, and/or 702, may utilize one or more components, such as the processor 402, the memory 404, the LBT module 408, the transceiver 410, the modem 412, and the one or more antennas 416, to execute the steps of method 1500. Alternatively, a wireless communication device, such as the BSs 105 and/or 500 and/or the nodes 202, 302, and/or 702, may utilize one or more components, such as the processor 502, the memory 504, the LBT module 508, the transceiver 510, the modem 512, and the one or more antennas 516, to execute the steps of method 1500. The method 1500 may employ similar mechanisms as in the methods 900, 1000, 1100, 1200, and/or 1300 discussed above with reference to FIGS. 9, 10, 11, 12, and/or 13, respectively. As illustrated, the method 1500 includes a number of enumerated steps, but aspects of the method 1500 may include additional steps before, after, and in between the enumerated steps. In some aspects, one or more of the enumerated steps may be omitted or performed in a different order.

At block 1510, a first wireless communication device performs an LBT (e.g., the LBT 205) in a channel to contend for a first TXOP (e.g., the TXOP 208). The channel can be a shared frequency band or an unlicensed band. In some instances, the listening node may utilize one or more components, such as the processor 402 or 502, the LBT module 408 or 508, the transceiver 410 or 510, the modem 412 or 512, the one or more antennas 416 or 516, and/or the channel access determination component 610, to perform the LBT by monitoring signals in the channel and performing RRS decoding and/or RRQ decoding and/or preamble detection on signals received from the channel.

At block 1520, the first wireless communication device receives, from a second wireless communication device, a first reservation signal (e.g., an RRQ signal 210 or an RRS signal 220) reserving a second TXOP in the channel in response to the LBT, where the second TXOP is different from the first TXOP. In some instances, the listening node may utilize one or more components, such as the processor 402 or 502, the LBT module 408 or 508, the transceiver 410 or 510, the modem 412 or 512, the one or more antennas 416 or 516, and/or the channel access determination component 610, to receive the first reservation signal by receiving a signal from the channel, performing RRS decoding and/or RRQ decoding on received signal, and determining that the received signal is a reservation signal.

In some aspects, the first wireless communication may correspond to one of a BS (e.g., an NR-U BS) or a UE (e.g., an NR-U UE), and the second wireless communication device may correspond to a different one of the BS or the UE. In some aspects, the first wireless communication may correspond to one of an AP (e.g., an IEEE 802.11 AP) or an STA (e.g., an IEEE 802.11 STA), and the second wireless communication device may correspond to a different one of the AP or the STA.

At block 1530, the first wireless communication device selects a signal detection threshold based on at least one of a communication role of the first wireless communication device in the first TXOP or a communication role of the second wireless communication device in the second TXOP. In some instances, the listening node may utilize one or more components, such as the processor 402 or 502, the LBT module 408 or 508, the transceiver 410 or 510, the modem 412 or 512, the one or more antennas 416 or 516, and/or the channel access determination component 610, to select the signal detection threshold based on the at least one of the communication role of the first wireless communication device in the first TXOP or the communication role of the second wireless communication device in the second TXOP.

In some aspects, the first wireless communication device may select the LBT signal detection threshold based on whether the second wireless communication is a receiver or a transmitter in the second TXOP, for example, similar to the method 900 described above with reference to FIG. 9. In some aspects, the first wireless communication device may select the LBT signal detection threshold based on whether the first wireless communication is a receiver or a transmitter in the second TXOP, for example, similar to the method 1000 described above with reference to FIG. 10. In some aspects, the first wireless communication device may select the LBT signal detection threshold based on whether the second wireless communication device is a BS or a UE, for example, similar to the method 1300 described above with reference to FIG. 11. In some aspects, the first wireless communication device may further select the LBT signal detection threshold based on whether the first wireless communication device is a BS or a UE, for example, similar to the method 1200 described above with reference to FIG. 12. In some aspects, the first wireless communication device may further select the LBT signal detection threshold based on whether the first reservation signal is an RRQ signal (e.g., the RRQ signal 210) or an RRS signal (e.g., the RRS signal 220), for example, similar to the method 1300 described above with reference to FIG. 13.

At block 1540, the first wireless communication device determines whether to yield channel access during the second TXOP based on a comparison of a signal measurement (e.g., the reservation signal receive quality metric 602, 710, and/or 810) of the first reservation signal and the adjusted signal detection threshold (e.g., the threshold 616). In some instances, the listening node may utilize one or more components, such as the processor 402 or 502, the LBT module 408 or 508, the transceiver 410 or 510, the modem 412 or 512, the one or more antennas 416 or 516, and/or the channel access determination component 610, to determine whether to yield channel access during the second TXOP based on whether the signal measurement exceeds the selected signal detection threshold.

In some aspects, the first wireless communication device may communicate, with a third wireless communication device, the first data traffic during the first TXOP overlapping with at least a portion of the second TXOP in response to determining not to yield channel access during the second TXOP at block 1540, for example, when the signal measurement is lower than the selected signal detection threshold. In some other aspects, the first wireless communication device may refrain from communicating during the second TXOP in response to determining to yield channel access during the second TXOP at block 1540, for example, when the signal measurement is greater than the selected signal detection threshold.

Further aspects of the present disclosure include a method of wireless communication. The method of wireless communication includes performing, by a first wireless communication device, a listen-before-talk (LBT) in a channel to contend for a first transmission opportunity (TXOP); receiving, by the first wireless communication device from a second wireless communication device, a first reservation signal reserving a second TXOP in the channel in response to the LBT, the second TXOP being different from the first TXOP; adjusting, by the first wireless communication device, a signal detection threshold based on transmit power information associated with at least one of the first wireless communication device, the second wireless communication device, first data traffic to be communicated in the first TXOP, or second data traffic to be communicated in the second TXOP. The method of wireless communication also includes determining, by the first wireless communication device, whether to yield channel access during the second TXOP based on a comparison of a signal measurement of the first reservation signal and the adjusted signal detection threshold.

The method may also include one or more of the following features. For instance, the method may include communicating, by the first wireless communication device with a third wireless communication device, the first data traffic during the first TXOP overlapping with at least a portion of the second TXOP in response to determining not to yield channel access during the second TXOP. The method may include refraining, by the first wireless communication device, from communicating during the second TXOP in response to determining to yield channel access during the second TXOP. The adjusting the signal detection threshold is based on first transmit power information associated with the first wireless communication device and second transmit power information associated with the second wireless communication device. The adjusting the signal detection threshold is based on a difference between a first transmit power associated with the first wireless communication device and a second transmit power associated with the second wireless communication device. The adjusting the signal detection threshold is further based on a path loss between the first wireless communication device and the second wireless communication device. The adjusting the signal detection threshold is based on first transmit power information associated with the second wireless communication device and second transmit power information associated with the second data traffic. The adjusting the signal detection threshold is further based on the second wireless communication device being a receiver of the second data traffic. The adjusting the signal detection threshold is based on a difference between a first transmit power associated with the second wireless communication device and a second transmit power associated with the second data traffic. The first reservation signal indicates at least one of first transmit power information associated with the second wireless communication device or second transmit power information associated with the second data traffic. The first reservation signal indicates the first transmit power information associated with the second wireless communication device and the second transmit power information associated with the second data traffic. The at least one of the first transmit power information or the second transmit power information is associated with at least one of a power class, a maximum rated power, a maximum output power, a maximum effective isotropic radiated power (EIRP), or a transmit power lookup table. The second reservation signal is transmitted at a first transmit power, and where the second reservation signal indicates information associated with at least one of the first transmit power or a second transmit power associated with the third data traffic.

Further aspects of the present disclosure include a method of wireless communication. The method of wireless communication includes performing, by a first wireless communication device, a listen-before-talk (LBT) in a channel to contend for a first transmission opportunity (TXOP); receiving, by the first wireless communication device from a second wireless communication device, a first reservation signal reserving a second TXOP in the channel in response to the LBT, the second TXOP different from the first TXOP; selecting, by the first wireless communication device, a signal detection threshold based on at least one of a communication role of the first wireless communication device in the first TXOP or a communication role of the second wireless communication device in the second TXOP. The method of wireless communication also includes determining, by the first wireless communication device, whether to yield channel access during the second TXOP based on a comparison of a signal measurement of the first reservation signal and the signal detection threshold.

The method may also include one or more of the following features. For instance, the method may include communicating, by the first wireless communication device with a third wireless communication device different from the second wireless communication device, a communication signal during the first TXOP overlapping with at least a portion of the second TXOP in response to determining not to yield channel access during the second TXOP. The method may include refraining, by the first wireless communication device, from communicating with a third wireless communication device during the second TXOP in response to determining to yield channel access during the second TXOP. The method may include determining, by the first wireless communication device, the communication role of the second wireless communication device in the second TXOP, the communication role of the second wireless communication device in the second TXOP being a transmitter or a receiver. The selecting includes selecting, by the first wireless communication device, a first threshold as the signal detection threshold in response to determining that the second wireless communication device is the receiver in the second TXOP; or selecting, by the first wireless communication device, a second threshold as the signal detection threshold in response to determining that the second wireless communication device is the transmitter in the second TXOP, the second threshold being different from the first threshold. The first threshold is higher than the second threshold. The first reservation signal includes an indication of the communication role of the second wireless communication device in the second TXOP. The method may include determining, by the first wireless communication device, the communication role of the first wireless communication device in the second TXOP, the communication role of the first wireless communication device in the second TXOP being a transmitter or a receiver. The selecting includes selecting, by the first wireless communication device, a first threshold as the signal detection threshold in response to determining that the first wireless communication device is a receiver in the first TXOP; or selecting, by the first wireless communication device, a second threshold as the signal detection threshold in response to determining that the first wireless communication device is a transmitter in the first TXOP, the second threshold being different from the first threshold. The first threshold is lower than the second threshold. The method may include receiving, by the first wireless communication device, a reservation request (RRQ) signal indicating the communication role of the first wireless communication device in the first TXOP. The selecting the signal detection threshold is further based on whether the first reservation signal is a reservation request (RRQ) signal or a reservation response (RRS) signal. The selecting the signal detection threshold includes selecting, by the first wireless communication device, a first threshold as the signal detection threshold in response to a determination that the first reservation signal is the RRQ signal; or selecting, by the first wireless communication device, a second threshold as the signal detection threshold in response to a determination that the first reservation signal is the RRS signal, the second threshold being different from the first threshold. The first threshold is lower than the second threshold. The selecting the signal detection threshold includes selecting, by the first wireless communication device, a first threshold as the signal detection threshold based on data traffic to be communicated during the first TXOP being associated with a transmission schedule; or selecting, by the first wireless communication device, a second threshold as the signal detection threshold based on the data traffic to be communicated during the first TXOP being associated with an autonomous transmission, the second threshold being different from the first threshold. The selecting the signal detection threshold is further based on at least one of a number of antennas, a noise figure, or a signal bandwidth at the first wireless communication device. The selecting the signal detection threshold is further based on a node type of at least one of the first wireless communication device or the second wireless communication device, the node type including a base station, an access point, or a user equipment. The second reservation signal includes information associated with at least one of a communication role of the first wireless communication device in the third TXOP, a node type of the first wireless communication device, or a reservation signal type of the second reservation signal.

Further aspects of the present disclosure include an apparatus including a processor configured to perform a listen-before-talk (LBT) in a channel to contend for a first transmission opportunity (TXOP); and a transceiver configured to receive, from a second wireless communication device, a first reservation signal reserving a second TXOP in the channel in response to the LBT, the second TXOP being different from the first TXOP. The apparatus also includes where the processor is further configured to adjust a signal detection threshold based on transmit power information associated with at least one of the apparatus, the second wireless communication device, first data traffic to be communicated in the first TXOP, or second data traffic to be communicated in the second TXOP; and determine whether to yield channel access during the second TXOP based on a comparison of a signal measurement of the first reservation signal and the adjusted signal detection threshold.

The apparatus may also include one or more of the following features. For instance, the apparatus where the transceiver is further configured to communicate, with a third wireless communication device, the first data traffic during the first TXOP overlapping with at least a portion of the second TXOP in response to determining not to yield channel access during the second TXOP. The processor is further configured to refrain from communicating during the second TXOP in response to determining to yield channel access during the second TXOP. The processor configured to adjust the signal detection threshold is configured to adjust the signal detection threshold further based on first transmit power information associated with the apparatus and second transmit power information associated with the second wireless communication device. The processor configured to adjust the signal detection threshold is configured to adjust the signal detection threshold further based on a difference between a first transmit power associated with the apparatus and a second transmit power associated with the second wireless communication device. The processor configured to adjust the signal detection threshold is configured to adjust the signal detection threshold further based on a path loss between the apparatus and the second wireless communication device. The processor configured to adjust the signal detection threshold is configured to adjust the signal detection threshold further based on first transmit power information associated with the second wireless communication device and second transmit power information associated with the second data traffic. The processor configured to adjust the signal detection threshold is configured to adjust the signal detection threshold further based on the second wireless communication device being a receiver of the second data traffic. The processor configured to adjust the signal detection threshold is configured to adjust the signal detection threshold further based on a difference between a first transmit power associated with the second wireless communication device and a second transmit power associated with the second data traffic. The first reservation signal indicates at least one of first transmit power information associated with the second wireless communication device or second transmit power information associated with the second data traffic. The first reservation signal indicates the first transmit power information associated with the second wireless communication device and the second transmit power information associated with the second data traffic. The at least one of the first transmit power information or the second transmit power information is associated with at least one of a power class, a maximum rated power, a maximum output power, a maximum effective isotropic radiated power (EIRP), or a transmit power lookup table. The transceiver is further configured to transmit a second reservation signal reserving a third TXOP for communicating third data traffic, where the second reservation signal is transmitted at a first transmit power, and where the second reservation signal indicates information associated with at least one of the first transmit power or a second transmit power associated with the third data traffic.

Further aspects of the present disclosure include an apparatus including a processor configured to perform a listen-before-talk (LBT) in a channel to contend for a first transmission opportunity (TXOP); and a transceiver configured to receive, from a second wireless communication device, a first reservation signal reserving a second TXOP in the channel in response to the LBT, the second TXOP different from the first TXOP, where the processor is further configured to select a signal detection threshold based on at least one of a communication role of the apparatus in the first TXOP or a communication role of the second wireless communication device in the second TXOP; and determine whether to yield channel access during the second TXOP based on a comparison of a signal measurement of the first reservation signal and the signal detection threshold.

The apparatus may also include one or more of the following features. For instance, the apparatus may include where the transceiver is further configured to communicate, with a third wireless communication device different from the second wireless communication device, a communication signal during the first TXOP overlapping with at least a portion of the second TXOP in response to determining not to yield channel access during the second TXOP. The processor is further configured to refrain from communicating with a third wireless communication device during the second TXOP in response to determining to yield channel access during the second TXOP. The processor is further configured to determine the communication role of the second wireless communication device in the second TXOP, the communication role of the second wireless communication device in the second TXOP being a transmitter or a receiver. The processor configured to select the signal detection threshold is configured to select a first threshold as the signal detection threshold in response to determining that the second wireless communication device is the receiver in the second TXOP; or select a second threshold as the signal detection threshold in response to determining that the second wireless communication device is the transmitter in the second TXOP, the second threshold being different from the first threshold. The first threshold is higher than the second threshold. The first reservation signal includes an indication of the communication role of the second wireless communication device in the second TXOP. The processor is further configured to determine the communication role of the apparatus in the second TXOP, the communication role of the apparatus in the second TXOP being a transmitter or a receiver. The processor configured to select the signal detection threshold is configured to select a first threshold as the signal detection threshold in response to determining that the apparatus is a receiver in the first TXOP; or select a second threshold as the signal detection threshold in response to determining that the apparatus is a transmitter in the first TXOP, the second threshold being different from the first threshold. The first threshold is lower than the second threshold. The transceiver is further configured to receive a reservation request (RRQ) signal indicating the communication role of the apparatus in the first TXOP. The processor configured to select the signal detection threshold is configured to select the signal detection threshold further based on whether the first reservation signal is a reservation request (RRQ) signal or a reservation response (RRS) signal. The processor configured to select the signal detection threshold is configured to select a first threshold as the signal detection threshold in response to a determination that the first reservation signal is the RRQ signal; or select a second threshold as the signal detection threshold in response to a determination that the first reservation signal is the RRS signal, the second threshold being different from the first threshold. The first threshold is lower than the second threshold. The processor configured to select the signal detection threshold is configured to select a first threshold as the signal detection threshold based on data traffic to be communicated during the first TXOP being associated with a transmission schedule; or select a second threshold as the signal detection threshold based on the data traffic to be communicated during the first TXOP being associated with an autonomous transmission, the second threshold being different from the first threshold. The processor configured to select the signal detection threshold is configured to select the signal detection threshold further based on at least one of a number of antennas, a noise figure, or a signal bandwidth at the apparatus. The processor configured to select the signal detection threshold is configured to select the signal detection threshold further based on a node type of at least one of the apparatus or the second wireless communication device, the node type including a base station, an access point, or a user equipment. The transceiver is further configured to transmit a second reservation signal reserving a third TXOP, where the second reservation signal includes information associated with at least one of a communication role of the apparatus in the third TXOP, a node type of the apparatus, or a reservation signal type of the second reservation signal.

Further aspects of the present disclosure include a non-transitory computer-readable medium having program code recorded thereon. The non-transitory computer-readable medium includes code for causing a first wireless communication device to perform a listen-before-talk (LBT) in a channel to contend for a first transmission opportunity (TXOP). The non-transitory computer-readable medium also includes code for causing the first wireless communication device to receive, from a second wireless communication device, a first reservation signal reserving a second TXOP in the channel in response to the LBT, the second TXOP being different from the first TXOP. The non-transitory computer-readable medium also includes code for causing the first wireless communication device to adjust a signal detection threshold based on transmit power information associated with at least one of the first wireless communication device, the second wireless communication device, first data traffic to be communicated in the first TXOP, or second data traffic to be communicated in the second TXOP. The non-transitory computer-readable medium also includes code for causing the first wireless communication device to determine whether to yield channel access during the second TXOP based on a comparison of a signal measurement of the first reservation signal and the adjusted signal detection threshold.

The non-transitory computer-readable medium may also include one or more of the following features. For instance, the non-transitory computer-readable medium may include code for causing the first wireless communication device to communicate, with a third wireless communication device, the first data traffic during the first TXOP overlapping with at least a portion of the second TXOP in response to determining not to yield channel access during the second TXOP. The non-transitory computer-readable medium may include code for causing the first wireless communication device to refrain from communicating during the second TXOP in response to determining to yield channel access during the second TXOP. The code for causing the first wireless communication device to adjust the signal detection threshold is configured to adjust the signal detection threshold further based on first transmit power information associated with the first wireless communication device and second transmit power information associated with the second wireless communication device. The code for causing the first wireless communication device to adjust the signal detection threshold is configured to adjust the signal detection threshold further based on a difference between a first transmit power associated with the first wireless communication device and a second transmit power associated with the second wireless communication device. The code for causing the first wireless communication device to adjust the signal detection threshold is configured to adjust the signal detection threshold further based on a path loss between the first wireless communication device and the second wireless communication device. The code for causing the first wireless communication device to adjust the signal detection threshold is configured to adjust the signal detection threshold further based on first transmit power information associated with the second wireless communication device and second transmit power information associated with the second data traffic. The code for causing the first wireless communication device to adjust the signal detection threshold is configured to adjust the signal detection threshold further based on the second wireless communication device being a receiver of the second data traffic. The code for causing the first wireless communication device to adjust the signal detection threshold is configured to adjust the signal detection threshold further based on a difference between a first transmit power associated with the second wireless communication device and a second transmit power associated with the second data traffic. The first reservation signal indicates at least one of first transmit power information associated with the second wireless communication device or second transmit power information associated with the second data traffic. The first reservation signal indicates the first transmit power information associated with the second wireless communication device and the second transmit power information associated with the second data traffic. The at least one of the first transmit power information or the second transmit power information is associated with at least one of a power class, a maximum rated power, a maximum output power, a maximum effective isotropic radiated power (EIRP), or a transmit power lookup table. The second reservation signal is transmitted at a first transmit power, and where the second reservation signal indicates information associated with at least one of the first transmit power or a second transmit power associated with the third data traffic.

Further aspects of the present disclosure include a non-transitory computer-readable medium having program code recorded thereon. The non-transitory computer-readable medium includes code for causing a first wireless communication device to perform a listen-before-talk (LBT) in a channel to contend for a first transmission opportunity (TXOP); code for causing the first wireless communication device to receive, from a second wireless communication device, a first reservation signal reserving a second TXOP in the channel in response to the LBT, the second TXOP different from the first TXOP. The non-transitory computer-readable medium also includes code for causing the first wireless communication device to select a signal detection threshold based on at least one of a communication role of the first wireless communication device in the first TXOP or a communication role of the second wireless communication device in the second TXOP. The non-transitory computer-readable medium also includes code for causing the first wireless communication device to determine whether to yield channel access during the second TXOP based on a comparison of a signal measurement of the first reservation signal and the signal detection threshold.

The non-transitory computer-readable medium may also include one or more of the following features. For instance, the non-transitory computer-readable medium may include code for causing the first wireless communication device to communicate, with a third wireless communication device different from the second wireless communication device, a communication signal during the first TXOP overlapping with at least a portion of the second TXOP in response to determining not to yield channel access during the second TXOP. The non-transitory computer-readable medium may include code for causing the first wireless communication device to refrain from communicating with a third wireless communication device during the second TXOP in response to determining to yield channel access during the second TXOP. The non-transitory computer-readable medium may include code for causing the first wireless communication device to determine the communication role of the second wireless communication device in the second TXOP, the communication role of the second wireless communication device in the second TXOP being a transmitter or a receiver. The code for causing the first wireless communication device to select the signal detection threshold is configured to select a first threshold as the signal detection threshold in response to determining that the second wireless communication device is the receiver in the second TXOP; or select a second threshold as the signal detection threshold in response to determining that the second wireless communication device is the transmitter in the second TXOP, the second threshold being different from the first threshold. The first threshold is higher than the second threshold. The first reservation signal includes an indication of the communication role of the second wireless communication device in the second TXOP. The non-transitory computer-readable medium may include code for causing the first wireless communication device to determine the communication role of the first wireless communication device in the second TXOP, the communication role of the first wireless communication device in the second TXOP being a transmitter or a receiver. The code for causing the first wireless communication device to select the signal detection threshold is configured to select a first threshold as the signal detection threshold in response to determining that the first wireless communication device is a receiver in the first TXOP; or select a second threshold as the signal detection threshold in response to determining that the first wireless communication device is a transmitter in the first TXOP, the second threshold being different from the first threshold. The first threshold is lower than the second threshold. The non-transitory computer-readable medium may include code for causing the first wireless communication device to receive a reservation request (RRQ) signal indicating the communication role of the first wireless communication device in the first TXOP. The code for causing the first wireless communication device to select the signal detection threshold is configured to select the signal detection threshold further based on whether the first reservation signal is a reservation request (RRQ) signal or a reservation response (RRS) signal. The code for causing the first wireless communication device to select the signal detection threshold is configured to select a first threshold as the signal detection threshold in response to a determination that the first reservation signal is the RRQ signal; or select a second threshold as the signal detection threshold in response to a determination that the first reservation signal is the RRS signal, the second threshold being different from the first threshold. The first threshold is lower than the second threshold. The code for causing the first wireless communication device to select the signal detection threshold is configured to select a first threshold as the signal detection threshold based on data traffic to be communicated during the first TXOP being associated with a transmission schedule; or select a second threshold as the signal detection threshold based on the data traffic to be communicated during the first TXOP being associated with an autonomous transmission, the second threshold being different from the first threshold. The code for causing the first wireless communication device to select the signal detection threshold is configured to select the signal detection threshold further based on at least one of a number of antennas, a noise figure, or a signal bandwidth at the non-transitory computer-readable medium. The code for causing the first wireless communication device to select the signal detection threshold is configured to select the signal detection threshold further based on a node type of at least one of the first wireless communication device or the second wireless communication device, the node type including a base station, an access point, or a user equipment. The second reservation signal includes information associated with at least one of a communication role of the first wireless communication device in the third TXOP, a node type of the first wireless communication device, or a reservation signal type of the second reservation signal.

Further aspects of the present disclosure include an apparatus including means for performing a listen-before-talk (LBT) in a channel to contend for a first transmission opportunity (TXOP). The apparatus also includes means for receiving, from a second wireless communication device, a first reservation signal reserving a second TXOP in the channel in response to the LBT, the second TXOP being different from the first TXOP. The apparatus also includes means for adjusting a signal detection threshold based on transmit power information associated with at least one of the apparatus, the second wireless communication device, first data traffic to be communicated in the first TXOP, or second data traffic to be communicated in the second TXOP. The apparatus also includes means for determining whether to yield channel access during the second TXOP based on a comparison of a signal measurement of the first reservation signal and the adjusted signal detection threshold.

The apparatus may also include one or more of the following features. For instance, the apparatus may include means for communicating, with a third wireless communication device, the first data traffic during the first TXOP overlapping with at least a portion of the second TXOP in response to determining not to yield channel access during the second TXOP. The apparatus may include means for refraining from communicating during the second TXOP in response to determining to yield channel access during the second TXOP. The means for adjusting the signal detection threshold is configured to adjust the signal detection threshold further based on first transmit power information associated with the apparatus and second transmit power information associated with the second wireless communication device. The means for adjusting the signal detection threshold is configured to adjust the signal detection threshold further based on a difference between a first transmit power associated with the apparatus and a second transmit power associated with the second wireless communication device. The means for adjusting the signal detection threshold is configured to adjust the signal detection threshold further based on a path loss between the apparatus and the second wireless communication device. The means for adjusting the signal detection threshold is configured to adjust the signal detection threshold further based on first transmit power information associated with the second wireless communication device and second transmit power information associated with the second data traffic. The means for adjusting the signal detection threshold is configured to adjust the signal detection threshold further based on the second wireless communication device being a receiver of the second data traffic. The means for adjusting the signal detection threshold is configured to adjust the signal detection threshold further based on a difference between a first transmit power associated with the second wireless communication device and a second transmit power associated with the second data traffic. The first reservation signal indicates at least one of first transmit power information associated with the second wireless communication device or second transmit power information associated with the second data traffic. The first reservation signal indicates the first transmit power information associated with the second wireless communication device and the second transmit power information associated with the second data traffic. The at least one of the first transmit power information or the second transmit power information is associated with at least one of a power class, a maximum rated power, a maximum output power, a maximum effective isotropic radiated power (EIRP), or a transmit power lookup table. The second reservation signal is transmitted at a first transmit power, and where the second reservation signal indicates information associated with at least one of the first transmit power or a second transmit power associated with the third data traffic.

Further aspects of the present disclosure include an apparatus including means for performing a listen-before-talk (LBT) in a channel to contend for a first transmission opportunity (TXOP); means for receiving, from a second wireless communication device, a first reservation signal reserving a second TXOP in the channel in response to the LBT, the second TXOP different from the first TXOP. The apparatus also includes means for selecting a signal detection threshold based on at least one of a communication role of the apparatus in the first TXOP or a communication role of the second wireless communication device in the second TXOP. The apparatus also includes means for determining whether to yield channel access during the second TXOP based on a comparison of a signal measurement of the first reservation signal and the signal detection threshold.

The apparatus may also include one or more of the following features. For instance, the apparatus may include means for communicating, with a third wireless communication device different from the second wireless communication device, a communication signal during the first TXOP overlapping with at least a portion of the second TXOP in response to determining not to yield channel access during the second TXOP. The apparatus may include means for refraining from communicating with a third wireless communication device during the second TXOP in response to determining to yield channel access during the second TXOP. The apparatus may include means for determining the communication role of the second wireless communication device in the second TXOP, the communication role of the second wireless communication device in the second TXOP being a transmitter or a receiver. The means for selecting the signal detection threshold is configured to select a first threshold as the signal detection threshold in response to determining that the second wireless communication device is the receiver in the second TXOP; or select a second threshold as the signal detection threshold in response to determining that the second wireless communication device is the transmitter in the second TXOP, the second threshold being different from the first threshold. The first threshold is higher than the second threshold. The first reservation signal includes an indication of the communication role of the second wireless communication device in the second TXOP. The apparatus may include means for determining the communication role of the apparatus in the second TXOP, the communication role of the apparatus in the second TXOP being a transmitter or a receiver. The means for selecting the signal detection threshold is configured to select a first threshold as the signal detection threshold in response to determining that the apparatus is a receiver in the first TXOP; or select a second threshold as the signal detection threshold in response to determining that the apparatus is a transmitter in the first TXOP, the second threshold being different from the first threshold. The apparatus may include means for receiving a reservation request (RRQ) signal indicating the communication role of the apparatus in the first TXOP. The means for selecting the signal detection threshold is configured to select the signal detection threshold further based on whether the first reservation signal is a reservation request (RRQ) signal or a reservation response (RRS) signal. The means for selecting the signal detection threshold is configured to select a first threshold as the signal detection threshold based on data traffic to be communicated during the first TXOP being associated with a transmission schedule; or select a second threshold as the signal detection threshold based on the data traffic to be communicated during the first TXOP being associated with an autonomous transmission, the second threshold being different from the first threshold. The means for selecting the signal detection threshold is configured to select the signal detection threshold further based on at least one of a number of antennas, a noise figure, or a signal bandwidth at the apparatus. The means for selecting the signal detection threshold is configured to select the signal detection threshold further based on a node type of at least one of the apparatus or the second wireless communication device, the node type including a base station, an access point, or a user equipment. The second reservation signal includes information associated with at least one of a communication role of the apparatus in the third TXOP, a node type of the apparatus, or a reservation signal type of the second reservation signal.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:
1. A method of wireless communication, comprising:
    performing, by a first wireless communication device, a listen-before-talk (LBT) in a channel to contend for a first transmission opportunity (TXOP);

receiving, by the first wireless communication device from a second wireless communication device, a first reservation signal reserving a second TXOP in the channel in response to the LBT, the second TXOP being different from the first TXOP;

adjusting, by the first wireless communication device, a signal detection threshold based on at least one of:
  transmit power information associated with the first wireless communication device and transmit power information associated with the second wireless communication device;
  first data traffic to be communicated in the first TXOP; or
  second data traffic to be communicated in the second TXOP; and determining, by the first wireless communication device, whether to yield channel access during the second TXOP based on a comparison of a signal measurement of the first reservation signal and the adjusted signal detection threshold.

2. The method of claim 1, wherein the adjusting the signal detection threshold is based on at least one of:
  a difference between a first transmit power associated with the first wireless communication device and a second transmit power associated with the second wireless communication device; or
  a path loss between the first wireless communication device and the second wireless communication device.

3. The method of claim 1, wherein the adjusting the signal detection threshold is based on first transmit power information associated with the second wireless communication device and second transmit power information associated with the second data traffic.

4. The method of claim 1, wherein the adjusting the signal detection threshold is based on a difference between a first transmit power associated with the second wireless communication device and a second transmit power associated with the second data traffic.

5. The method of claim 1, wherein the first reservation signal indicates at least one of first transmit power information associated with the second wireless communication device or second transmit power information associated with the second data traffic, and wherein the first transmit power information or the second transmit power information is associated with at least one of a power class, a maximum rated power, a maximum output power, a maximum effective isotropic radiated power (EIRP), or a transmit power lookup table.

6. The method of claim 1, further comprising:
  transmitting, by the first wireless communication device, a second reservation signal reserving a third TXOP for communicating third data traffic, wherein the second reservation signal is transmitted at a first transmit power, and wherein the second reservation signal indicates information associated with at least one of the first transmit power or a second transmit power associated with the third data traffic.

7. An apparatus comprising:
a memory;
a transceiver; and
at least one processor coupled to the memory and the transceiver, wherein the apparatus is configured to:
perform a listen-before-talk (LBT) in a channel to contend for a first transmission opportunity (TXOP);
receive, from a second wireless communication device, a first reservation signal reserving a second TXOP in the channel in response to the LBT, the second TXOP being different from the first TXOP;

adjust a signal detection threshold based on at least one of:
  transmit power information associated with the apparatus and transmit power information associated with the second wireless communication device;
  first data traffic to be communicated in the first TXOP; or
  second data traffic to be communicated in the second TXOP; and determine whether to yield channel access during the second TXOP based on a comparison of a signal measurement of the first reservation signal and the adjusted signal detection threshold.

8. The apparatus of claim 7, wherein the apparatus is further configured to:
  adjust the signal detection threshold further based on at least one of:
  a difference between a first transmit power associated with the apparatus and a second transmit power associated with the second wireless communication device; or
  a path loss between the apparatus and the second wireless communication device.

9. The apparatus of claim 7, wherein the apparatus is further configured to:
  adjust the signal detection threshold further based on first transmit power information associated with the second wireless communication device and second transmit power information associated with the second data traffic.

10. The apparatus of claim 7, wherein the apparatus is further configured to:
  adjust the signal detection threshold further based on a difference between a first transmit power associated with the second wireless communication device and a second transmit power associated with the second data traffic.

11. The apparatus of claim 7, wherein the first reservation signal indicates at least one of first transmit power information associated with the second wireless communication device or second transmit power information associated with the second data traffic, and wherein the first transmit power information or the second transmit power information is associated with at least one of a power class, a maximum rated power, a maximum output power, a maximum effective isotropic radiated power (EIRP), or a transmit power lookup table.

12. The apparatus of claim 7, wherein the apparatus is further configured to:
  transmit a second reservation signal reserving a third TXOP for communicating third data traffic, wherein the second reservation signal is transmitted at a first transmit power, and wherein the second reservation signal indicates information associated with at least one of the first transmit power or a second transmit power associated with the third data traffic.

13. A non-transitory computer-readable medium (CRM) having program code recorded thereon, the program code comprising:
  code for causing a first wireless communication device to perform a listen-before-talk (LBT) in a channel to contend for a first transmission opportunity (TXOP);
  code for causing the first wireless communication device to receive, from a second wireless communication device, a first reservation signal reserving a second TXOP in the channel in response to the LBT, the second TXOP being different from the first TXOP;

code for causing the first wireless communication device to adjust a signal detection threshold based on at least one of:
   transmit power information associated with the first wireless communication device and transmit power information associated with the second wireless communication device;
   first data traffic to be communicated in the first TXOP; or
   second data traffic to be communicated in the second TXOP; and code for causing the first wireless communication device to determine whether to yield channel access during the second TXOP based on a comparison of a signal measurement of the first reservation signal and the adjusted signal detection threshold.

14. The non-transitory CRM of claim 13, wherein the program code further comprises code for causing the first wireless communication device to:
   adjust the signal detection threshold further based on at least one of:
      a difference between a first transmit power associated with the apparatus and a second transmit power associated with the second wireless communication device; or
      a path loss between the apparatus and the second wireless communication device.

15. The non-transitory CRM of claim 13, wherein the program code further comprises code for causing the first wireless communication device to:
   adjust the signal detection threshold further based on first transmit power information associated with the second wireless communication device and second transmit power information associated with the second data traffic.

16. The non-transitory CRM of claim 13, wherein the program code further comprises code for causing the first wireless communication device to:
   adjust the signal detection threshold further based on a difference between a first transmit power associated with the second wireless communication device and a second transmit power associated with the second data traffic.

17. The non-transitory CRM of claim 13, wherein the first reservation signal indicates at least one of first transmit power information associated with the second wireless communication device or second transmit power information associated with the second data traffic, and wherein the first transmit power information or the second transmit power information is associated with at least one of a power class, a maximum rated power, a maximum output power, a maximum effective isotropic radiated power (EIRP), or a transmit power lookup table.

18. The non-transitory CRM of claim 13, wherein the program code further comprises code for causing the first wireless communication device to:
   transmit a second reservation signal reserving a third TXOP for communicating third data traffic, wherein the second reservation signal is transmitted at a first transmit power, and wherein the second reservation signal indicates information associated with at least one of the first transmit power or a second transmit power associated with the third data traffic.

19. A first wireless communication device, comprising:
   means for performing a listen-before-talk (LBT) in a channel to contend for a first transmission opportunity (TXOP);
   means for receiving, from a second wireless communication device, a first reservation signal reserving a second TXOP in the channel in response to the LBT, the second TXOP being different from the first TXOP;
   means for adjusting a signal detection threshold based on at least one of:
      transmit power information associated with the first wireless communication device and transmit power information associated with the second wireless communication device;
      first data traffic to be communicated in the first TXOP; or
      second data traffic to be communicated in the second TXOP; and
   means for determining whether to yield channel access during the second TXOP based on a comparison of a signal measurement of the first reservation signal and the adjusted signal detection threshold.

20. The first wireless communication device of claim 19, wherein the means for adjusting the signal detection threshold is based on at least one of:
   a difference between a first transmit power associated with the first wireless communication device and a second transmit power associated with the second wireless communication device; or
   a path loss between the first wireless communication device and the second wireless communication device.

21. The first wireless communication device of claim 19, wherein the means for adjusting the signal detection threshold is based on first transmit power information associated with the second wireless communication device and second transmit power information associated with the second data traffic.

22. The first wireless communication device of claim 19, wherein the means for adjusting the signal detection threshold is based on a difference between a first transmit power associated with the second wireless communication device and a second transmit power associated with the second data traffic.

23. The first wireless communication device of claim 19, wherein the first reservation signal indicates at least one of first transmit power information associated with the second wireless communication device or second transmit power information associated with the second data traffic, and wherein the first transmit power information or the second transmit power information is associated with at least one of a power class, a maximum rated power, a maximum output power, a maximum effective isotropic radiated power (EIRP), or a transmit power lookup table.

24. The first wireless communication device of claim 19, further comprising:
   means for transmitting, by the first wireless communication device, a second reservation signal reserving a third TXOP for communicating third data traffic, wherein the second reservation signal is transmitted at a first transmit power, and wherein the second reservation signal indicates information associated with at least one of the first transmit power or a second transmit power associated with the third data traffic.

* * * * *